US010056956B2

(12) United States Patent
Rahman et al.

(10) Patent No.: US 10,056,956 B2
(45) Date of Patent: Aug. 21, 2018

(54) PRECODER CODEBOOK FOR CSI REPORTING IN ADVANCED WIRELESS COMMUNICATION SYSTEMS

(71) Applicant: Samsung Electronics Co., Ltd, Suwon-si (KR)

(72) Inventors: Md. Saifur Rahman, Richardson, TX (US); Eko Onggosanusi, Allen, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 15/466,660

(22) Filed: Mar. 22, 2017

(65) Prior Publication Data

US 2017/0279509 A1    Sep. 28, 2017

Related U.S. Application Data

(60) Provisional application No. 62/312,640, filed on Mar. 24, 2016, provisional application No. 62/374,412, (Continued)

(51) Int. Cl.
*H04B 7/0456* (2017.01)
*H04W 72/04* (2009.01)
(Continued)

(52) U.S. Cl.
CPC ......... *H04B 7/0478* (2013.01); *H04B 7/0626* (2013.01); *H04B 7/0639* (2013.01);
(Continued)

(58) Field of Classification Search
CPC .. H04B 7/0626; H04B 7/0639; H04B 7/0478; H04B 7/0632; H04B 7/0413;
(Continued)

(56) References Cited

U.S. PATENT DOCUMENTS 9,281,881 B2 * 3/2016 Onggosanusi ....... H04B 7/0469
2012/0113816 A1 * 5/2012 Bhattad ................ H04L 5/0032
370/246

(Continued)

FOREIGN PATENT DOCUMENTS

KR    1020150064383 A    6/2015
WO    2015103612 A1    9/2015

OTHER PUBLICATIONS

3GPP TS 36.211 V14.1.0 (Dec. 2016) LTE; Evolved Universal Terrestrial Radio Access (E-UTRA); Physical channels and modulation (3GPP TS 36.211 version 14.1.0 Release 14)—Dec. 2016—175 Pages.

(Continued)

*Primary Examiner* — Emmanuel Bayard

(57) ABSTRACT

A method for a channel state information (CSI) feedback in an advanced communication system. The method comprises receiving, from a base station (BS), CSI feedback configuration information for a precoding matrix indicator (PMI) feedback using a higher layer signaling, wherein the CSI feedback configuration information includes a combination of an oversampling factor $(O_1, O_2)$ and a dual polarized CSI reference signal (CSI-RS) antenna port layout $(N_1, N_2)$, and wherein subscripts 1 and 2 stand for a first dimension and a second dimension, respectively, and a number of dual polarized CSI-RS ports $P=2N_1N_2$. The method further comprises determining, by a user equipment (UE), the PMI using a Class A codebook and the configured combination of the $(O_1, O_2)$ and $(N_1, N_2)$ and transmitting, to the BS, the CSI feedback over an uplink channel including the determined PMI.

17 Claims, 14 Drawing Sheets

Related U.S. Application Data filed on Aug. 12, 2016, provisional application No. 62/379,395, filed on Aug. 25, 2016, provisional application No. 62/400,770, filed on Sep. 28, 2016.

(51) Int. Cl.
*H04L 5/00* (2006.01)
*H04B 7/06* (2006.01)
*H04W 88/02* (2009.01)
*H04W 88/08* (2009.01)

(52) U.S. Cl.
CPC ........... *H04L 5/0048* (2013.01); *H04W 72/04* (2013.01); *H04W 88/02* (2013.01); *H04W 88/08* (2013.01)

(58) Field of Classification Search
CPC .. H04B 7/0417; H04B 7/0619; H04B 7/0456; H04L 5/0048
USPC .................................. 375/267, 299, 347, 349
See application file for complete search history.

(56) References Cited

U.S. PATENT DOCUMENTS

| | | | | |
|---|---|---|---|---|
| 2014/0098689 A1* | 4/2014 | Lee | ...................... | H04B 7/0469 370/252 |
| 2014/0177745 A1* | 6/2014 | Krishnamurthy | .... | H04B 7/0413 375/267 |
| 2014/0254701 A1 | 9/2014 | Geirhofer et al. | | |
| 2015/0023194 A1* | 1/2015 | Seo | ...................... | H04W 24/10 370/252 |
| 2015/0030092 A1* | 1/2015 | Krishnamurthy | .... | H04B 7/0456 375/267 |
| 2015/0195020 A1 | 7/2015 | Zhu et al. | | |
| 2015/0318909 A1* | 11/2015 | Zhang | ................. | H04B 7/0413 375/267 |
| 2016/0072562 A1 | 3/2016 | Onggosanusi et al. | | |
| 2016/0080051 A1* | 3/2016 | Sajadieh | ............. | H04B 7/0456 375/267 |
| 2016/0212643 A1* | 7/2016 | Park | ..................... | H04B 7/0626 |
| 2016/0277091 A1* | 9/2016 | Kim | ..................... | H04B 7/0478 |
| 2016/0337105 A1* | 11/2016 | Lawton | ................. | H04L 5/0057 |
| 2016/0359538 A1* | 12/2016 | Onggosanusi | ....... | H04B 7/0469 |
| 2016/0373175 A1* | 12/2016 | Harrison | ............. | H04B 7/0469 |
| 2017/0048037 A1* | 2/2017 | Yen | ..................... | H04B 7/0695 |
| 2017/0048863 A1* | 2/2017 | Tsai | ..................... | H04B 7/0456 |
| 2017/0180029 A1* | 6/2017 | Chen | .................... | H04B 7/0639 |
| 2017/0195017 A1* | 7/2017 | Kim | ..................... | H04B 7/0417 |
| 2017/0238323 A1* | 8/2017 | Marinier | ............... | H04W 72/06 370/329 |
| 2017/0244462 A1* | 8/2017 | Wei | ...................... | H04B 7/0626 |
| 2017/0294950 A1* | 10/2017 | Kim | ..................... | H04B 7/0626 |
| 2017/0302480 A1* | 10/2017 | Kim | .................... | H04L 25/0224 |

OTHER PUBLICATIONS

3GPP TS 36.212 V14.1.0 (Dec. 2016) LTE; Evolved Universal Terrestrial Radio Access (E-UTRA); Multiplexing and channel coding (3GPP TS 36.212 version 14.1.0 Release 14)—Dec. 2016—176 Pages.

3GPP TS 36.213 V14.1.0 (Dec. 2016) LTE; Evolved Universal Terrestrial Radio Access (E-UTRA); Physical layer procedures (3GPP TS 36.213 version 14.1.0 Release 14)—Dec. 2016—414 Pages.

3GPP TS 36.321 V14.1.0 (Dec. 2016) LTE; Evolved Universal Terrestrial Radio Access (E-UTRA); Medium Access Control (MAC) protocol specification (3GPP TS 36.321 version 14.1.0 Release 14)—Dec. 2016—98 Pages.

3GPP TS 36.331 V14.1.0 (Dec. 2016) LTE; Evolved Universal Terrestrial Radio Access (E-UTRA); Radio Resource Control (RRC) Protocol specification (3GPP TS 36.331 version 14.1.0 Release 14)—Dec. 2016—654 Pages.

3GPP RAN Meeting #71 (RP-160623); New WID Proposal: Enhancements on Full-Dimension (FD) MIMO for LTE Approval; Agenda Item 10.1.1—Mar. 7-10, 2016—8 Pages.

3GPP TS 36.213 V13.0.1 (Jan. 2016), 3rd Generation Partnership Project; Technical Specification Group Radio Access Network; Evolved Universal Terrestrial Radio Access (E-UTRA); Physical layer procedures (Release 13), 226 pages.

ISA/KR, "International Search Report," Application No. PCT/KR2017/003096, dated Jul. 18, 2017, 3 pages.

* cited by examiner

1200

| Number of ports | Port layouts, and ($N_1, N_2$) values | | |
|---|---|---|---|
| 2 | (1,1) × | | |
| 4 | (2,1) × × | | |
| 8 | (2,2) × ×<br>× × | (4,1) × × × × | |
| 12 | (2,3) × ×<br>× ×<br>× × | × × ×<br>× × ×<br>(3,2) | × × × × × ×<br>(6,1) |
| 16 | (2,4) × ×<br>× ×<br>× ×<br>× × | × × × ×<br>× × × ×<br>(4,2) | × × × × × × × ×<br>(8,1) |

$2^{nd}$ dim ↑
$1^{st}$ dim →

| # ports | Port layouts, and ($N_1, N_2$) values | | | # ports | Port layouts, and ($N_1, N_2$) values | | |
|---|---|---|---|---|---|---|---|
| 20 | (5,2) xxxxx xxxxx | (2,5) xxxxx xxxxx xx | (1,10) xxxxxxxxxx | 28 | (7,2) xxxxxxx xxxxxxx | (2,7) xxxxxxx xxxxxxx xxxxxx | (1,14) xxxxxxxxxxxxxx |
|  | (10,1) xxxxxxxxxx | | | | (14,1) xxxxxxxxxxxxxx | | |
| 24 | (4,3) xxxx xxxx xxxx | (3,4) xxxx xxxx xxxx | (2,6) xxxxxx xxxxxx | 32 | (4,4) xxxx xxxx xxxx xxxx | (8,2) xxxxxxxx xxxxxxxx | (2,8) xxxxxxxx xxxxxxxx |
|  | (6,2) xxxxxx xxxxxx | | (1,12) xxxxxxxxxxxx | | (16,1) xxxxxxxxxxxxxxxx | | (1,16) xxxxxxxxxxxxxxxx |
|  | (12,1) xxxxxxxxxxxx | | | | | | |

1300

| Codebook-Config | Rank 1 beam group | Number of beams $(L_1,L_2)$ |
|---|---|---|
| 1 | | (1,1) |
| 2 | | (2,2) |
| 3 | | (4,2) if $N_1 >= N_2$ <br> (2,4) otherwise |
| 4 | | (4,1) if $N_1 >= N_2$ <br> (1,4) otherwise |

FIG. 17

| Codebook-Config | Rank 1 beam group | Number of beams $(L_1,L_2)$ | |
|---|---|---|---|
| | | $N_1 >= N_2$ | $N_1 < N_2$ |
| Alt 1: 1 <br> Alt 2: 5 | | (2,1) | (1,2) |
| Alt 1: 2 <br> Alt 2: 6 | | (4,2) | (2,4) |
| Alt 1: 3 <br> Alt 2: 7 | | (8,2) | (2,8) |
| Alt 1: 4 <br> Alt 2: 8 | | (8,1) | (1,8) |

PRECODER CODEBOOK FOR CSI REPORTING IN ADVANCED WIRELESS COMMUNICATION SYSTEMS

CROSS-REFERENCE TO RELATED APPLICATIONS AND CLAIM OF PRIORITY

The present application claims priority to U.S. Provisional Patent Application Ser. No. 62/312,640, filed on Mar. 24, 2016, entitled "Precoder Codebook for CSI Reporting in Advanced Wireless Communication Systems;" U.S. Provisional Patent Application Ser. No. 62/374,412, filed on Aug. 12, 2016, entitled "Precoder Codebook for CSI Reporting in Advanced Wireless Communication Systems;" U.S. Provisional Patent Application Ser. No. 62/379,395, filed on Aug. 25, 2016, entitled "Precoder Codebook for CSI Reporting in Advanced Wireless Communication Systems;" U.S. Provisional Patent Application Ser. No. 62/400,770, filed on Sep. 28, 2016, entitled "Precoder Codebook for CSI Reporting in Advanced Wireless Communication Systems." The content of the above-identified patent documents are incorporated herein by reference.

TECHNICAL FIELD

The present application relates generally to channel state information (CSI) reporting operation in advanced wireless communication systems. More specifically, this disclosure relates to precoder matrix indicator (PMI) reporting based on a Class A PMI codebook.

BACKGROUND

Understanding and correctly estimating the channel in an advance wireless communication system between a user equipment (UE) and an eNode B (eNB) is important for efficient and effective wireless communication. In order to correctly estimate the channel conditions, the UE may report (e.g., feedback) information about channel measurement, e.g., CSI, to the eNB. With this information about the channel, the eNB is able to select appropriate communication parameters to efficiently and effectively perform wireless data communication with the UE. However, with increase in the numbers of antennas and channel paths of wireless communication devices, so too has the amount of feedback increased that may be needed to ideally estimate the channel. This additionally-desired channel feedback may create additional overheads, thus reducing the efficiency of the wireless communication, for example, decrease the data rate.

SUMMARY

The present disclosure relates to a pre-5$^{th}$-Generation (5G) or 5G communication system to be provided for supporting higher data rates beyond 4$^{th}$-Generation (4G) communication system such as Long Term Evolution (LTE). Embodiments of the present disclosure provide an advanced CSI reporting based on Class A codebook for MIMO wireless communication systems.

In one embodiment, a user equipment (UE) for a channel state information (CSI) feedback in an advanced communication system is provided. The UE includes a transceiver configured to receive, from a base station (BS), CSI feedback configuration information for a precoding matrix indicator (PMI) feedback using a higher layer signaling, wherein the CSI feedback configuration information includes a combination of an oversampling factor $(O_1, O_2)$ and a dual polarized CSI reference signal (CSI-RS) antenna port layout $(N_1, N_2)$, and wherein subscripts 1 and 2 stand for a first dimension and a second dimension, respectively, and a number of dual polarized CSI-RS ports $P=2N_1 N_2$. The UE further includes at least one processor configured to determine the PMI using a Class A codebook and the configured combination of the $(O_1, O_2)$ and $(N_1, N_2)$. The UE further comprises the transceiver configured to transmit, to the BS, the CSI feedback over an uplink channel including the determined PMI In another embodiment, a base station (BS) for a channel state information (CSI) feedback in an advanced communication system is provided. The BS includes a transceiver configured to transmit, to a user equipment (UE), CSI feedback configuration information for a precoding matrix indicator (PMI) feedback using a higher layer signaling, wherein the CSI feedback configuration information includes a combination of an oversampling factor $(O_1, O_2)$ and a dual polarized CSI reference signal (CSI-RS) antenna port layout $(N_1, N_2)$, and wherein subscripts 1 and 2 stand for a first dimension and a second dimension, respectively, and a number of dual polarized CSI-RS ports $P=2N_1 N_2$ and receive, from the UE, the CSI feedback over an uplink channel including the PMI determined using a Class A codebook and the configured combination of the $(O_1, O_2)$ and $(N_1, N_2)$.

In yet another embodiment, a method for a channel state information (CSI) feedback in an advanced communication system is provided. The method comprises receiving, from a base station (BS), CSI feedback configuration information for a precoding matrix indicator (PMI) feedback using a higher layer signaling, wherein the CSI feedback configuration information includes a combination of an oversampling factor $(O_1, O_2)$ and a dual polarized CSI reference signal (CSI-RS) antenna port layout $(N_1, N_2)$, and wherein subscripts 1 and 2 stand for a first dimension and a second dimension, respectively, and a number of dual polarized CSI-RS ports $P=2N_1 N_2$; determining, by a user equipment (UE), the PMI using a Class A codebook and the combination of the $(O_1, O_2)$ and $(N_1, N_2)$; and transmitting, to the BS, the CSI feedback over an uplink channel including the determined PMI.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

Aspects, features, and advantages of the present disclosure are readily apparent from the following detailed description, simply by illustrating a number of particular embodiments and implementations, including the best mode contemplated for carrying out the present disclosure. The present disclosure is also capable of other and different embodiments, and its several details can be modified in various obvious respects, all without departing from the spirit and scope of the invention. Accordingly, the drawings and description are to be regarded as illustrative in nature, and not as restrictive. The present disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), this invention can be extended to other OFDM-based transmission waveforms or multiple access schemes such as filtered OFDM (F-OFDM).

This present disclosure covers several components which can be used in conjunction or in combination with one another, or can operate as standalone schemes

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 12 illustrates an example dual-polarized antenna port layouts for {2, 4, 8, 12, 16} ports according to embodiments of the present disclosure;

FIG. 13 illustrates an example dual-polarized antenna port layouts for {20, 24, 28, 32} ports according to embodiments of the present disclosure;

FIG. 17 illustrates different number of beams in two dimensions, depending on Codebook-Config. $(i_{1,1}, i_{1,2})$; and FIG. 18 illustrates alternate Codebook-Config. to rank 1 beam group mapping.

DETAILED DESCRIPTION

FIG. 1 through FIG. 18, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

The following documents and standards descriptions are hereby incorporated by reference into the present disclosure as if fully set forth herein: 3GPP TS 36.211 v14.1.0, "E-UTRA, Physical channels and modulation" (REF1);

3GPP TS 36.212 v14.1.0, "E-UTRA, Multiplexing and Channel coding" (REF2); 3GPP TS 36.213 v14.1.0, "E-UTRA, Physical Layer Procedures" (REF3); 3GPP TS 36.321 v14.1.0, "E-UTRA, Medium Access Control (MAC) protocol specification" (REF4); 3GPP TS 36.331 v14.1.0, "E-UTRA, Radio Resource Control (RRC) protocol specification" (REF5); and RP-160623, "New WID Proposal: Enhancements on Full-Dimension (FD) MIMO for LTE," Samsung.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
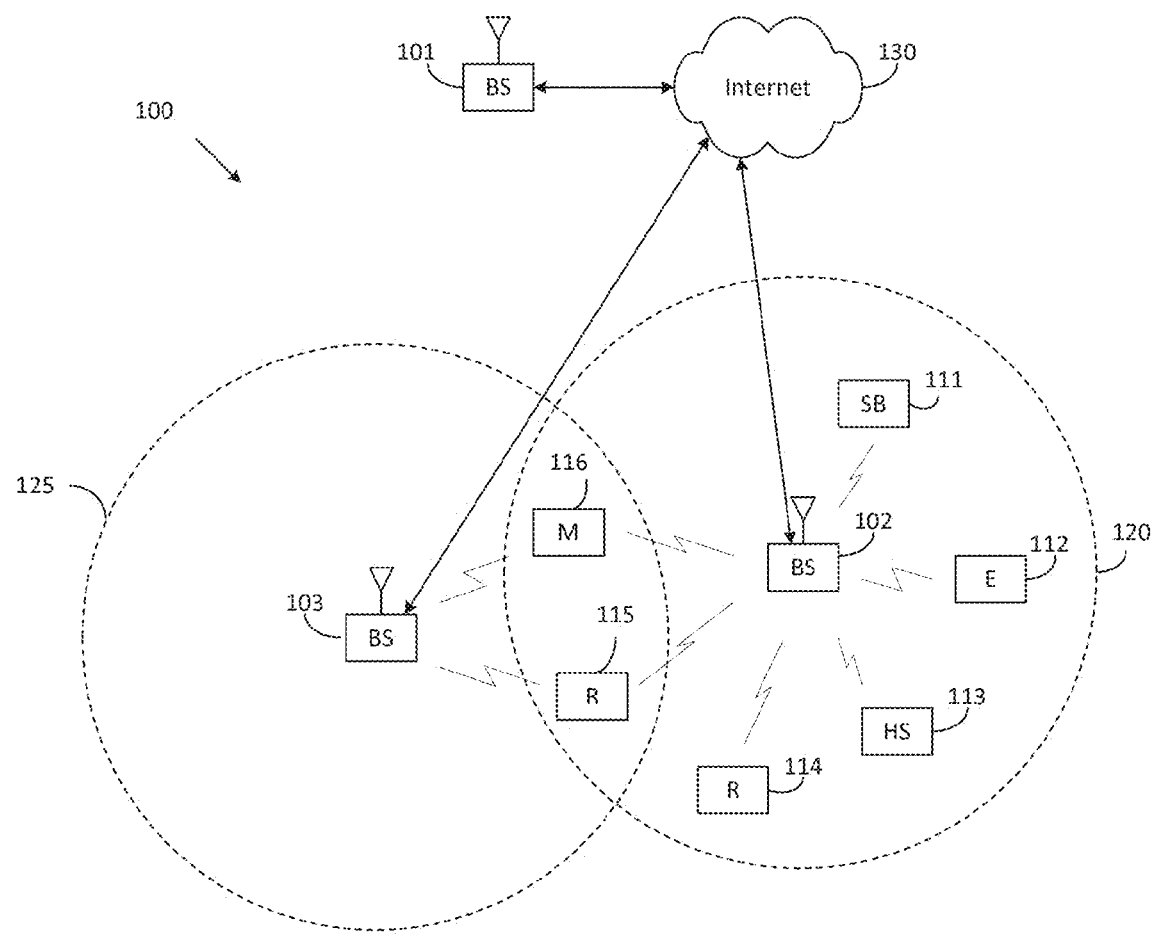
FIG. 1 illustrates an example wireless network according to embodiments of the present disclosure.
Figure 2:
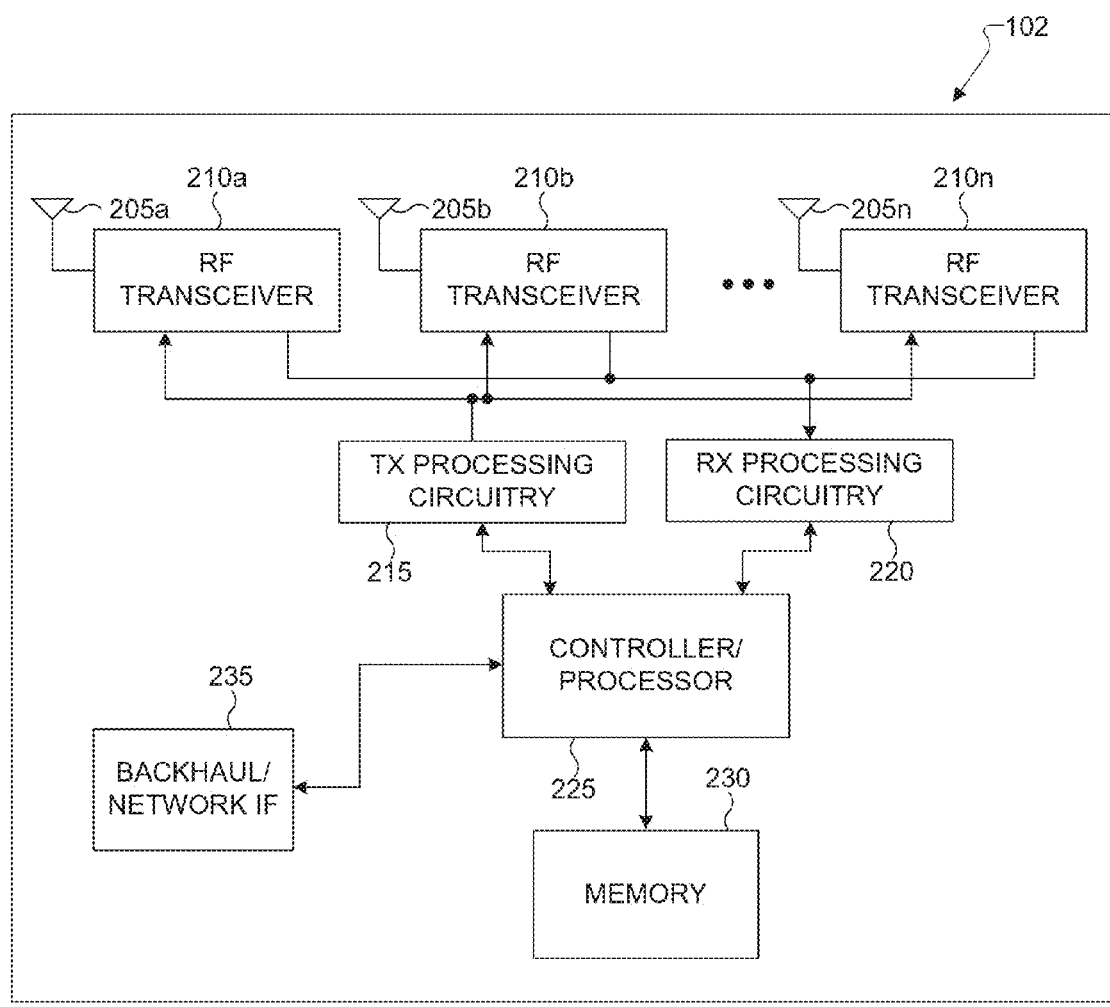
FIG. 2 illustrates an example eNodeB (eNB) according to embodiments of the present disclosure.
Figure 3:
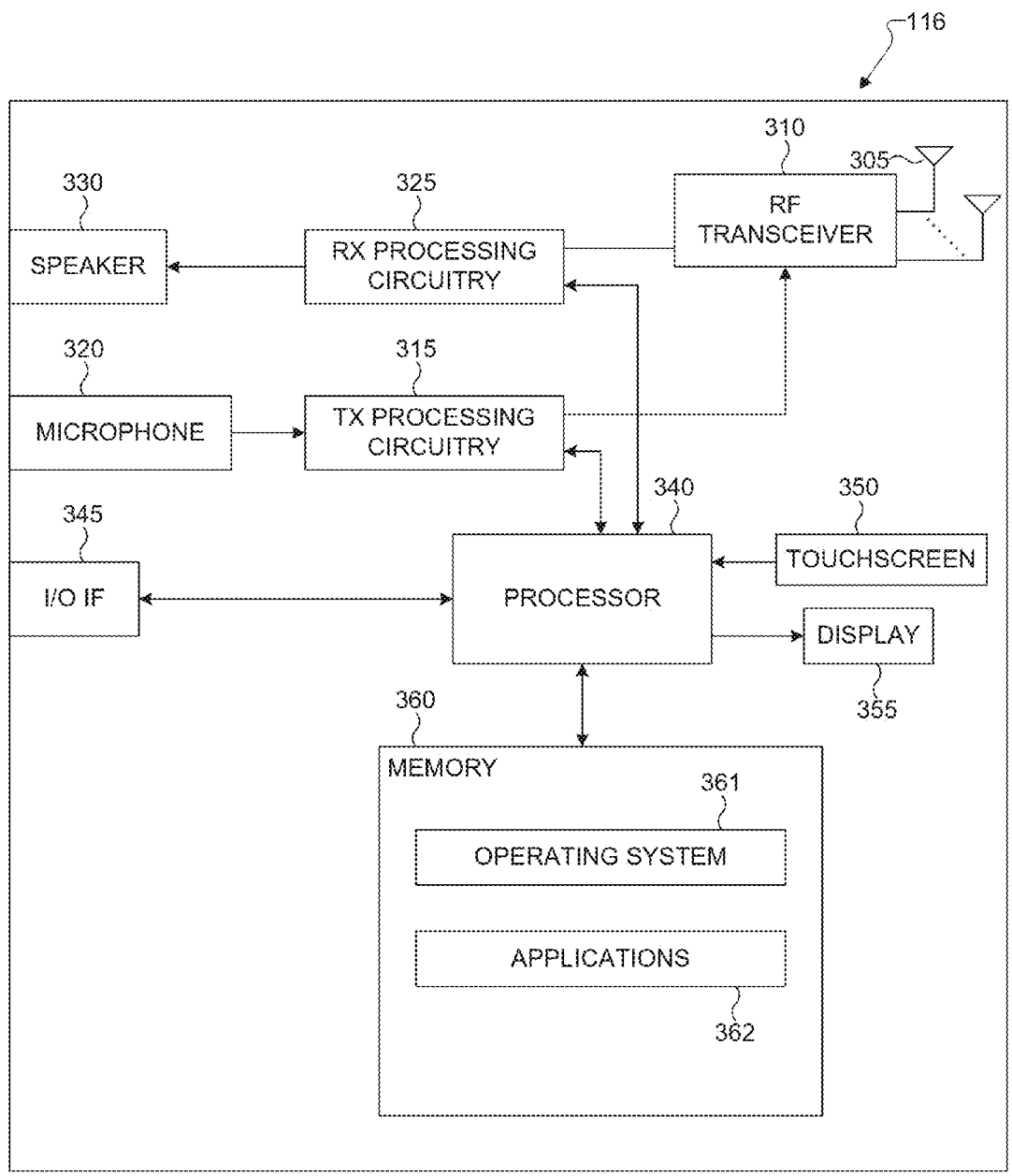
FIG. 3 illustrates an example user equipment (UE) according to embodiments of the present disclosure.

FIGS. 1-4B below describe various embodiments implemented in wireless communications systems and with the use of OFDM or OFDMA communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), gNB, a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient CSI reporting on an uplink channel in an advanced wireless communication system. In certain embodiments, and one or more of the eNBs 101-103 includes circuitry, programming, or a combination thereof, for receiving efficient CSI reporting on an uplink channel in an advanced wireless communication system.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiment, the RF transceivers 210a-210n is capable of transmitting, to a user equipment (UE), CSI feedback configuration information for a precoding matrix indicator (PMI) feedback using a higher layer signaling, wherein the CSI feedback configuration information includes a combination of an oversampling factor ($O_1$, $O_2$) and a dual polarized CSI reference signal (CSI-RS) antenna port layout ($N_1$, $N_2$), and wherein subscripts 1 and 2 stand for a first dimension and a second dimension, respectively, and a number of dual polarized CSI-RS ports P=$2N_1N_2$ and receiving, from the UE, the CSI feedback over an uplink channel including the PMI determined using a Class A codebook and the configured combination of the ($O_1$, $O_2$) and ($N_1$, $N_2$).

In such embodiment, the combination of the ($O_1$, $O_2$) and ($N_1$, $N_2$) is determined based on a table as follows:

| Number of CSI-RS antenna ports, P | ($N_1$, $N_2$) | ($O_1$, $O_2$) |
|---|---|---|
| 20 | (2, 5) | (8, 4) |
|    | (5, 2) | (4, 4) |
|    | (10, 1) | (4, —) |
| 24 | (2, 6) | (8, 4) |
|    | (3, 4) | (8, 4) |
|    | (4, 3) | (4, 4) |
|    | (6, 2) | (4, 4) |
|    | (12, 1) | (4, —) |
| 28 | (2, 7) | (8, 4) |
|    | (7, 2) | (4, 4) |
|    | (14, 1) | (4, —) |
| 32 | (2, 8) | (8, 4) |
|    | (4, 4) | (8, 4) |
|    | (8, 2) | (4, 4) |
|    | (16, 1) | (4, —). |

In such embodiments, the Class A codebook corresponds to the Class A codebook in long-term-evolution (LTE) specification.

In such embodiments, the higher layer signaling comprises at least one of a codebook-Config-N1 parameter to configure $N_1$, a codebook-Config-N2 parameter to configure $N_2$, a codebook-Over-Sampling-RateConfig-O1 parameter to configure $O_1$, a codebook-Over-Sampling-RateConfig-O2 parameter to configure $O_2$, or a Codebook-Config parameter to configure a value from a set {1,2,3,4} that corresponds to four types of beam groups for the PMI feedback using the Class A codebook.

In such embodiments, a Class A codebook parameter comprises at least one of a ($N_1$,$N_2$) pair, one or multiple ($O_1$,$O_2$) pairs, or a Codebook-Config parameter, and wherein the Codebook-Config parameter belongs to a set {1, 2, 3, 4} that corresponds to four types of beam groups for the PMI feedback using the Class A codebook.

In such embodiments, a Class A codebook parameter comprises at least one of a ($N_1$,$N_2$) pair, a ($O_1$,$O_2$) pair, none or at least one ($p_1$, $p_2$) pair, or a Codebook-Config parameter, wherein the Codebook-Config parameter belongs to a set {1, 2, 3, 4} that corresponds to four types of beam groups for the PMI feedback using the Class A codebook, and the at least one ($p_1$, $p_2$) pair comprises beam spacing parameters in the first and second dimensions to construct beam groups according to a value of Codebook-Config parameter, and wherein at least one of $p_1$ and $p_2$ comprises at least one value from a set {1, 2, . . . , $O_1$} and a set {1, 2, . . . , $O_2$}, respectively.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller. As described in more detail below, the eNB 102 may include circuitry, programming, or a combination thereof for processing of CSI reporting on an uplink channel. For example, controller/processor 225 can be configured to execute one or more instructions, stored in memory 230, that are configured to cause the controller/processor to process vector quantized feedback components such as channel coefficients.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving, from a base station (BS), CSI feedback configuration information for a precoding matrix indicator (PMI) feedback using a higher layer signaling, wherein the CSI feedback configuration information includes a combination of an oversampling factor $(O_1, O_2)$ and a dual polarized CSI reference signal (CSI-RS) antenna port layout $(N_1, N_2)$, and wherein subscripts 1 and 2 stand for a first dimension and a second dimension, respectively, and a number of dual polarized CSI-RS ports $P=2N_1N$;

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on an uplink channel. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340. In some embodiments, the processor 340 is also capable of determining, by a user equipment (UE), the PMI using a Class A codebook and the configured combination of the $(O_1, O_2)$ and $(N_1, N_2)$.

In such embodiments, the configured combination of the $(O_1, O_2)$ and $(N_1, N_2)$ is determined based on a table as follows:

| Number of CSI-RS antenna ports, P | $(N_1, N_2)$ | $(O_1, O_2)$ |
|---|---|---|
| 20 | (2, 5) | (8, 4) |
|  | (5, 2) | (4, 4) |
|  | (10, 1) | (4, —) |
| 24 | (2, 6) | (8, 4) |
|  | (3, 4) | (8, 4) |
|  | (4, 3) | (4, 4) |
|  | (6, 2) | (4, 4) |
|  | (12, 1) | (4, —) |
| 28 | (2, 7) | (8, 4) |
|  | (7, 2) | (4, 4) |
|  | (14, 1) | (4, —) |
| 32 | (2, 8) | (8, 4) |
|  | (4, 4) | (8, 4) |
|  | (8, 2) | (4, 4) |
|  | (16, 1) | (4, —). |

In such embodiment, the Class A codebook corresponds to the Class A codebook in long-term-evolution (LTE) specification.

In such embodiments, the higher layer signaling comprises at least one of a codebook-Config-N1 parameter to configure $N_1$, a codebook-Config-N2 parameter to configure $N_2$, a codebook-Over-Sampling-RateConfig-O1 parameter to configure $O_1$, a codebook-Over-Sampling-RateConfig-O2 parameter to configure $O_2$, or a Codebook-Config parameter to configure a value from a set {1,2,3,4} that corresponds to four types of beam groups for the PMI feedback using the Class A codebook.

In some embodiments, the processor 340 is capable of deriving a first PMI $i_1$ corresponding to the Class A codebook index pair $\{i_{1,1}, i_{1,2}\}$; and deriving a second PMI $i_2$ corresponding to the Class A codebook index $i_2$, wherein the PMI comprises the first PMI $i_1$ and the second PMI $i_2$.

In some embodiments, the processor 340 is capable of determining a Class A codebook parameter that comprises at least one of a ($N_1$, $N_2$) pair, one or multiple ($O_1$, $O_2$) pairs, or a Codebook-Config parameter, wherein the Codebook-Config parameter belongs to a set $\{1, 2, 3, 4\}$ that corresponds to four types of beam groups for the PMI feedback using the Class A codebook.

In some embodiments, the processor 340 is capable of determining a Class A codebook parameter that comprises at least one of a ($N_1$, $N_2$) pair, a ($O_1$, $O_2$) pair, none or at least one ($p_1$, $p_2$) pair, or a Codebook-Config parameter, wherein the Codebook-Config parameter belongs to a set $\{1, 2, 3, 4\}$ that corresponds to four types of beam groups for the PMI feedback using the Class A codebook, and the at least one ($p_1$, $p_2$) pair comprises beam spacing parameters in the first and second dimensions to construct beam groups according to a value of Codebook-Config parameter, and wherein at least one of $p_1$ and $p_2$ comprises at least one value from a set $\{1, 2, \ldots, O_1\}$ and a set $\{1, 2, \ldots, O_2\}$, respectively.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
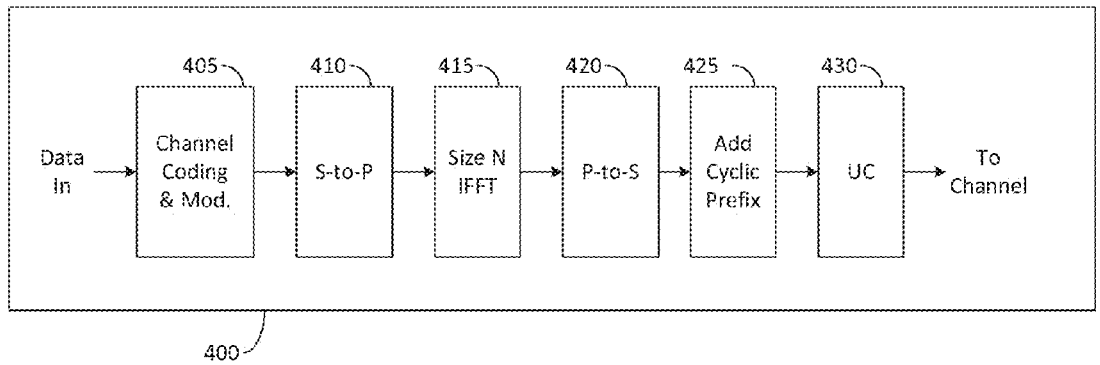
FIG. 4A illustrates a high-level diagram of an orthogonal frequency division multiple access transmit path according to embodiments of the present disclosure.
Figure 4B:
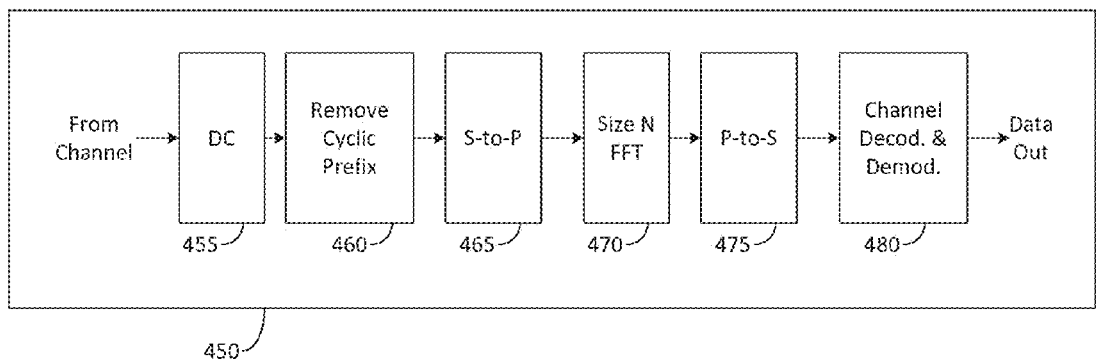
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an orthogonal frequency division multiple access (OFDMA) communication. FIG. 4B is a high-level diagram of receive path circuitry 450. For example, the receive path circuitry 450 may be used for an orthogonal frequency division multiple access (OFDMA) communication. In FIGS. 4A and 4B, for downlink communication, the transmit path circuitry 400 may be implemented in a base station (eNB) 102 or a relay station, and the receive path circuitry 450 may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry 400 may be implemented in a user equipment (e.g. user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It may be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Various embodiments of the present disclosure provides for a high-performance, scalability with respect to the number and geometry of transmit antennas, and a flexible CSI feedback (e.g., reporting) framework and structure for LTE enhancements when FD-MIMO with large two-dimensional antenna arrays is supported. To achieve high performance, more accurate CSI in terms MIMO channel is needed at the eNB especially for FDD scenarios. In this case, embodiments of the present disclosure recognize that the previous LTE (e.g. Rel. 12) precoding framework (PMI-based feedback) may need to be replaced. In this disclosure, properties of FD-MIMO are factored in for the present disclosure. For example, the use of closely spaced large 2D antenna arrays that is primarily geared toward high beamforming gain rather than spatial multiplexing along with relatively small angular spread for each UE. Therefore, compression or dimensionality reduction of the channel feedback in accordance with a fixed set of basic functions and vectors may be achieved. In another example, updated channel feedback parameters (e.g., the channel angular spreads) may be obtained at low mobility using UE-specific higher-layer signaling. In addition, a CSI reporting (feedback) may also be performed cumulatively.

Another embodiment of the present disclosure incorporates a CSI reporting method and procedure with a reduced PMI feedback. This PMI reporting at a lower rate pertains to long-term DL channel statistics and represents a choice of a group of precoding vectors recommended by a UE to an eNB. The present disclosure also includes a DL transmission method wherein an eNB transmits data to a UE over a plurality of beamforming vectors while utilizing an open-loop diversity scheme. Accordingly, the use of long-term precoding ensures that open-loop transmit diversity is applied only across a limited number of ports (rather than all the ports available for FD-MIMO, e.g., 64). This avoids having to support excessively high dimension for open-loop transmit diversity that reduces CSI feedback overhead and improves robustness when CSI measurement quality is questionable.

Figure 5:
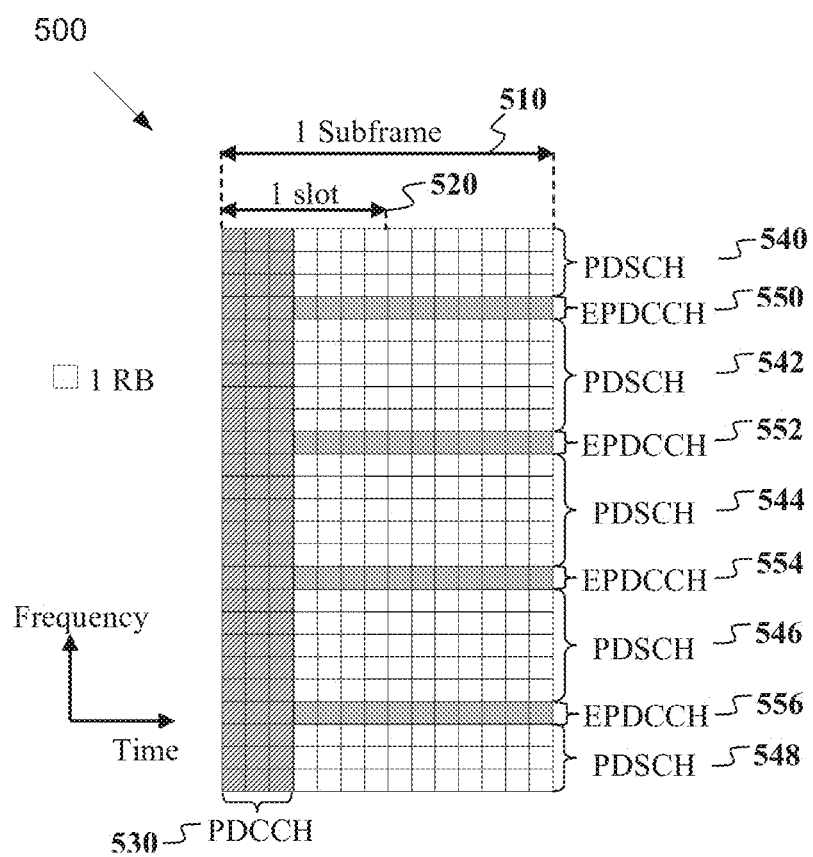
FIG. 5 illustrates an example structure for a downlink (DL) subframe according to embodiments of the present disclosure.

FIG. 5 illustrates an example structure for a DL subframe 500 according to embodiments of the present disclosure. An embodiment of the DL subframe structure 500 shown in FIG. 1 is for illustration only. Other embodiments may be used without departing from the scope of the present disclosure. The downlink subframe (DL SF) 510 includes two slots 520 and a total of $N_{symb}^{DL}$ symbols for transmitting of data information and downlink control information (DCI). The first $M_{symb}^{DL}$ SF symbols are used to transmit PDCCHs and other control channels 530 (not shown in FIG. 5). The remaining Z SF symbols are primarily used to transmit physical downlink shared channels (PDSCHs) 540, 542, 544, 546, and 548 or enhanced physical downlink control channels (EPDCCHs) 550, 552, 554, and 556. A transmission bandwidth (BW) comprises frequency resource units referred to as resource blocks (RBs). Each RB comprises either $N_{sc}^{RB}$ sub-carriers or resource elements (REs) (such as 12 Res). A unit of one RB over one subframe is referred to as a physical RB (PRB). A UE is allocated to $M_{PDSCH}$ RBs for a total of $Z=O_F+\lfloor (n_{s0}+y \cdot N_{EPDCCH})/D \rfloor$ REs for a PDSCH transmission BW. An EPDCCH transmission is achieved in either one RB or multiple of RBs.

Figure 6:
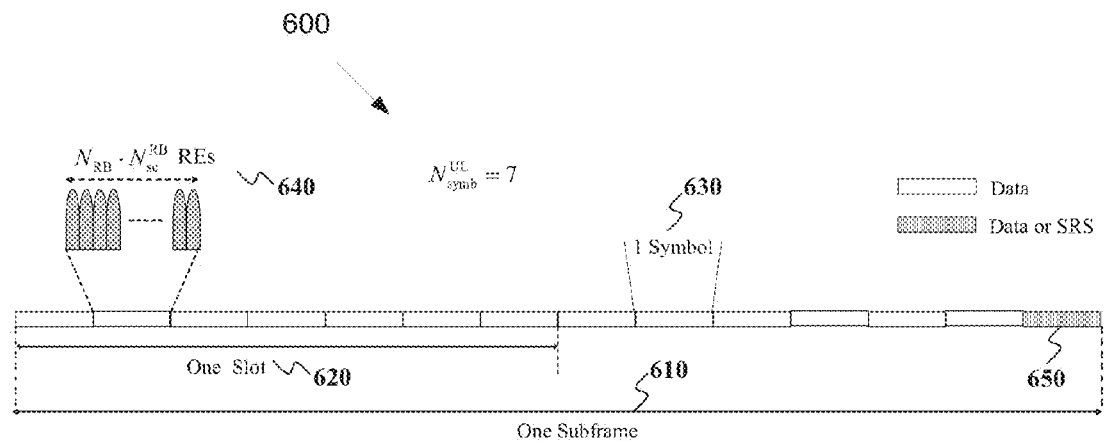
FIG. 6 illustrates an example transmission structure of an uplink (UL) subframe according to embodiments of the present disclosure.

FIG. 6 illustrates an example transmission structure of a physical uplink shared channel (PUSCH) subframe or a physical uplink control channel (PUCCH) subframe 600. Embodiments of the transmission structure for the PUSCH or the PUCCH over the UL subframe shown in FIG. 6 is for illustration only. Other embodiments could be used without departing from the scope of the present disclosure. A UL subframe 610 includes two slots. Each slot 620 includes $N_{symb}^{UL}$ symbols 630 for transmitting data information, uplink control information (UCI), demodulation reference signals (DMRS), or sounding RSs (SRSs). A frequency resource unit of an UL system BW is a RB. A UE is allocated to $N_{RB}$ RBs 640 for a total of $N_{RB} \cdot N_{sc}^{RB}$ resource elements (Res) for a transmission BW. For a PUCCH, $N_{RB}=1$. A last subframe symbol is used to multiplex SRS transmissions 650 from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 7:
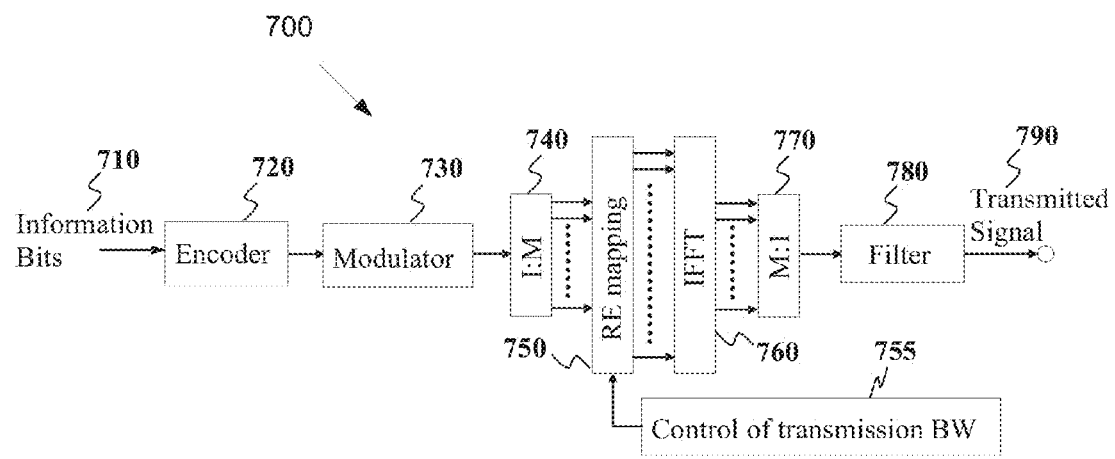
FIG. 7 illustrates an example transmitter block diagram for a physical downlink shared channel (PDSCH) subframe according to embodiments of the present disclosure.

FIG. 7 illustrates an example transmitter block diagram for a physical downlink shared channel (PDSCH) subframe 700 according to embodiments of the present disclosure. An embodiment of the PDSCH transmitter block diagram 700 shown in FIG. 7 is for illustration only. Other embodiments are used without departing from the scope of the present disclosure.

Information bits 710 are encoded by an encoder 720 (such as a turbo encoder) and modulated by a modulator 730, for example using a quadrature phase shift keying (QPSK) modulation. A Serial to Parallel (S/P) converter 740 generates M modulation symbols that are subsequently provided to a mapper 750 to be mapped to REs selected by a transmission BW selection unit 755 for an assigned PDSCH transmission BW, unit 760 applies an inverse fast Fourier transform (IFFT). An output is then serialized by a parallel to a serial (P/S) converter 770 to create a time domain signal, filtering is applied by a filter 780, and then signal is transmitted. Additional functionalities, such as data scrambling, a cyclic prefix insertion, a time windowing, an interleaving, and others are well known in the art and are not shown for brevity.

Figure 8:
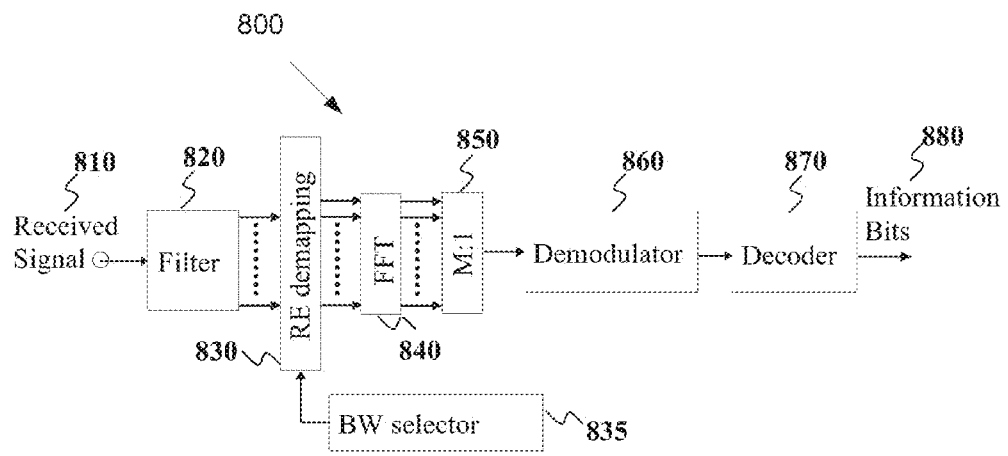
FIG. 8 illustrates an example receiver block diagram for a PDSCH subframe according to embodiments of the present disclosure.

FIG. 8 illustrates an example receiver block diagram for a packet data shared channel (PDSCH) subframe 800 according to embodiments of the present disclosure. An embodiment of the PDSCH receiver block diagram 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments can be used without departing from the scope of the present disclosure.

A received signal 810 is filtered by a filter 820, and then is output to a resource element (RE) demapping block 830. The RE demapping 830 assigns a reception bandwidth (BW) that is selected by a BW selector 835. The BW selector 835 is configured to control a transmission BW. A fast Fourier transform (FFT) circuit 840 applies a FFT. The output of the FFT circuitry 840 is serialized by a parallel-to-serial converter 850. Subsequently, a demodulator 860 coherently demodulates data symbols by applying a channel estimate obtained from a demodulation reference signal (DMRS) or a common reference signal (CRS) (not shown), and then a decoder 870 decodes demodulated data to provide an estimate of the information data bits 880. The decoder 870 can be configured to implement any decoding process, such as a turbo decoding process. Additional functionalities such as time-windowing, a cyclic prefix removal, a de-scrambling, channel estimation, and a de-interleaving are not shown for brevity.

Figure 9:
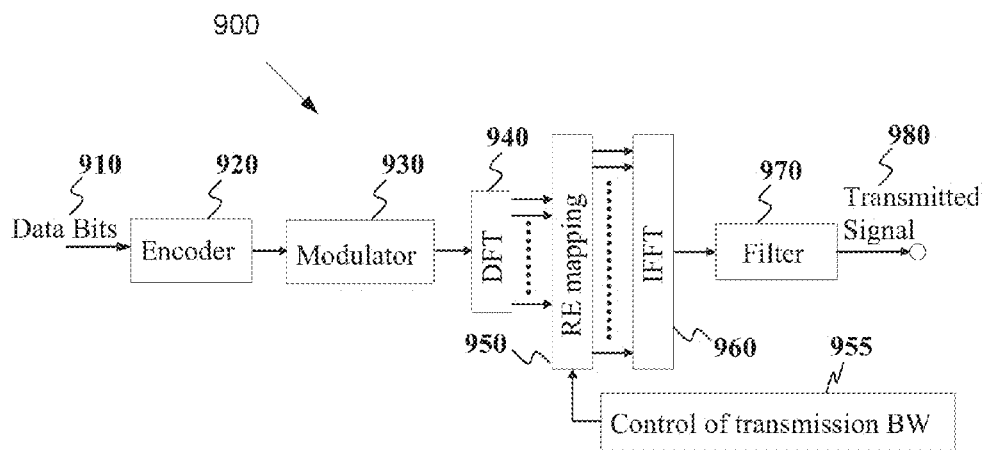
FIG. 9 illustrates an example transmitter block diagram for a physical uplink shared channel (PUSCH) subframe according to embodiments of the present disclosure.

FIG. 9 illustrates a transmitter block diagram for a physical uplink shared channel (PUSCH) subframe 900 according to embodiments of the present disclosure. One or more of the components illustrated in FIG. 9 can be implemented in specialized circuitry configured to perform the noted functions or one or more of the components can be implemented by one or more processors executing instructions to perform the noted functions. An embodiment of the PUSCH transmitter block diagram 900 shown in FIG. 9 is for illustration only. Other embodiments are used without departing from the scope of the present disclosure.

Information data bits 910 are encoded by an encoder 920 and modulated by a modulator 930. Encoder 920 can be configured to implement any encoding process, such as a turbo coding process. A discrete Fourier transform (DFT) circuitry 940 applies a DFT on the modulated data bits. REs are mapped by an RE mapping circuit 950. The REs corresponding to an assigned PUSCH transmission BW are selected by a transmission BW selection unit 955. An inverse FFT (IFFT) circuit 960 applies an IFFT to the output of the RE mapping circuit 950. After a cyclic prefix insertion (not shown), filter 970 applies a filtering. The filtered signal then is transmitted.

Figure 10:
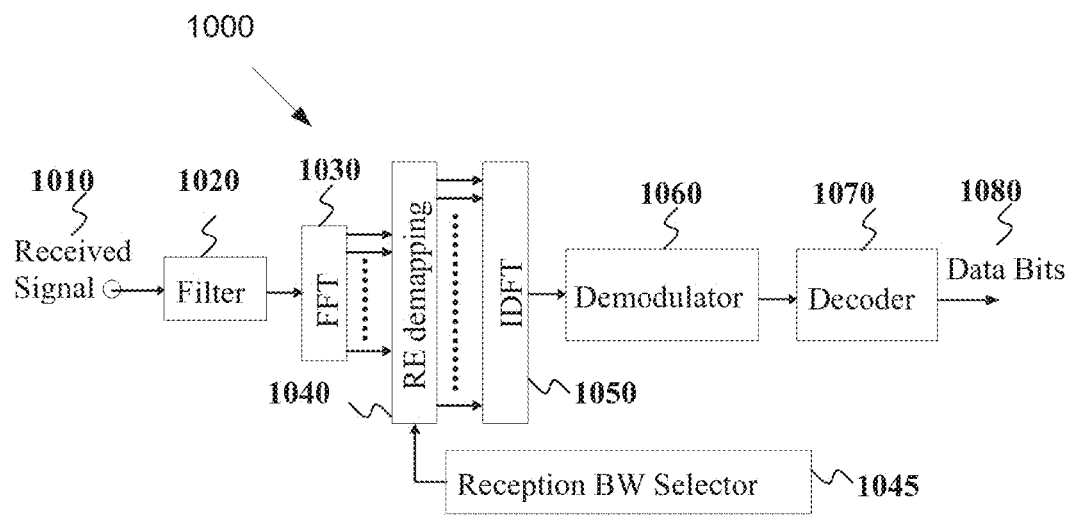
FIG. 10 illustrates an example receiver block diagram for a physical uplink shared channel (PUSCH) in a subframe according to embodiments of the present disclosure.

FIG. 10 illustrates an example receiver block diagram for a PUSCH subframe 1000 according to embodiments of the present disclosure. An embodiment of the PUSCH receiver block diagram 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

A received signal 1010 is filtered by a filter 1020. Subsequently, after a cyclic prefix is removed (not shown), an FFT circuit 1030 applies an FFT. REs are mapped by an RE mapping circuit 1040. REs 1040 corresponding to an assigned PUSCH reception BW are selected by a reception BW selector 1045. An inverse DFT (IDFT) circuit 1050 applies an IDFT. Demodulator 1060 receives an output from IDFT circuit 1050 and coherently demodulates data symbols by applying a channel estimate obtained from a DMRS (not shown). A decoder 1070 decodes the demodulated data to provide an estimate of the information data bits 1080. The decoder 1070 can be configured to implement any decoding process, such as a turbo decoding process.

Figure 11:
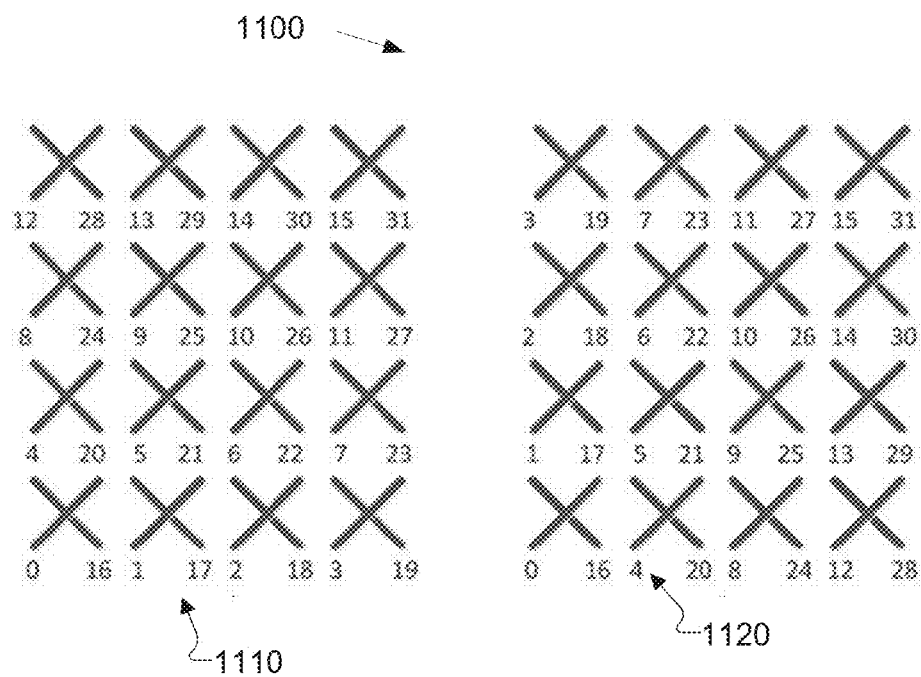
FIG. 11 illustrates an example configuration of a two dimensional (2D) array according to embodiments of the present disclosure.

FIG. 11 illustrates an example configuration of a two dimensional (2D) antenna array 1100 which is constructed from 16 dual-polarized antenna elements arranged in a 4×4 rectangular format according to embodiments of the present disclosure. In this illustration, each labelled antenna element is logically mapped onto a single antenna port. Two alternative labelling conventions are depicted for illustrative purposes (such as a horizontal first in 1110 and a vertical first in 1120). In one embodiment, one antenna port corresponds to multiple antenna elements (such as physical antennas) combined via a virtualization. This 4×4 dual polarized array is then viewed as 16×2=32-element array of elements. The vertical dimension (such as including 4 rows) facilitates an elevation beamforming in addition to an azimuthal beamforming across a horizontal dimension including 4 columns of dual polarized antennas. A MIMO precoding in Rel. 12 of the LTE standardization was largely designed to offer a precoding gain for one-dimensional antenna array. While fixed beamforming (such as antenna virtualization) is implemented across an elevation dimension, it is unable to reap a potential gain offered by a spatial and frequency selective nature of channels.

In 3GPP LTE specification, MIMO precoding (for beamforming or spatial multiplexing) can be facilitated via precoding matrix index (PMI) reporting as a component of channel state information (CSI) reporting. The PMI report is derived from one of the following sets of standardized codebooks: two antenna ports (single-stage); four antenna ports (single-stage or dual-stage); eight antenna ports (dual-stage); configurable dual-stage eMIMO-Type of 'CLASS A' codebook for eight, twelve, or sixteen antenna ports (also known as 'nonPrecoded);' and single-stage eMIMO-Type of 'CLASS B' codebook for two, four, or eight antenna ports (also known as 'beamformed').

If an eNodeB follows a PMI recommendation from a UE, the eNB is expected to precode the eNB's transmitted signal according to a recommended precoding vector or matrix for a given subframe and RB. Regardless whether the eNB follows this recommendation, the UE is configured to report a PMI according to a configured precoding codebook. Here a PMI, which may consist of a single index or a pair of indices, is associated with a precoding matrix W in an associated codebook.

When dual-stage class A codebook is configured, a resulting precoding matrix can be described in equation (1). That is, the first stage precoder can be described as a Kronecker product of a first and a second precoding vector (or matrix), which can be associated with a first and a second dimension, respectively. This type is termed partial Kronecker Product (partial KP) codebook. The subscripts m and n in $W_{m,n}(i_{m,n})$ denote precoding stage (first or second stage) and dimension (first or second dimension), respectively. Each of the precoding matrices $W_{m,n}$ can be described as a function of an index which serves as a PMI component. As a result, the precoding matrix W can be described as a function of 3 PMI components. The first stage pertains to a long-term component. Therefore it is associated with long-term channel statistics such as the aforementioned AoD profile and AoD spread. On the other hand, the second stage pertains to a short-term component which performs selection, co-phasing, or any linear operation to the first component precoder $W_{1,1}(i_{1,1}) \otimes W_{1,2}(i_{1,2})$. The precoder $W_2(i_2)$, therefore, performs a linear transformation of the long-term component such as a linear combination of a set of basic functions or vectors associated with the column vectors of $W_{1,1}(i_{1,1}) \otimes W_{1,2}(i_{1,2})$.

$$W(i_{1,1}, i_{1,2}, i_2) = \underbrace{(W_{1,1}(i_{1,1}) \otimes W_{1,2}(i_{1,2}))}_{W_1(i_{1,1}, i_{1,2})} W_2(i_2) \quad \text{Equation (1)}$$

The above discussion assumes that the serving eNB transmits and a served UE measures non-precoded CSI-RS (NP CSI-RS). That is, a cell-specific one-to-one mapping between CSI-RS port and TXRU is utilized. Here, different CSI-RS ports have the same wide beam width and direction and hence generally cell wide coverage. This use case can be realized when the eNB configures the UE with 'CLASS A' eMIMO-Type which corresponds to NP CSI-RS. Other than CQI and RI, CSI reports associated with 'CLASS A' or 'nonPrecoded' eMIMO-Type include a three-component PMI $\{i_{1,1}, i_{1,2}, i_2\}$.

Another type of CSI-RS applicable to FD-MIMO is beamformed CSI-RS (BF CSI-RS). In this case, beamforming operation, either cell-specific (with K>1 CSI-RS resources) or UE-specific (with K=1 CSI-RS resource), is applied on a non-zero-power (NZP) CSI-RS resource (consisting of multiple ports). Here, (at least at a given time/frequency) CSI-RS ports have narrow beam widths and hence not cell wide coverage, and (at least from the eNB perspective) at least some CSI-RS port-resource combinations have different beam directions. This beamforming operation is intended to increase CSI-RS coverage.

In addition, when UE-specific beamforming is applied to CSI-RS resource (termed the UE-specific or UE-specifically beamformed CSI-RS), CSI-RS overhead reduction is possible. UE complexity reduction is also evident since the configured number of ports tends to be much smaller than NP CSI-RS counterpart of the UE. When a UE is configured to receive BF CSI-RS from a serving eNB, the UE can be configured to report PMI parameter(s) associated with a second-stage precoder without the associated first-stage precoder or, in general, associated with a single-stage precoder/codebook. This use case can be realized when the eNB configures the UE with 'CLASS B' eMIMO-Type which corresponds to BF CSI-RS. Other than CQI and RI, CSI reports associated with 'CLASS B' or 'beamformed' eMIMO-Type (with one CSI-RS resource and alternative codebook) include a one-component PMI n. Although a single PMI defined with respect to a distinct codebook, this PMI can be associated with the second-stage PMI component of 'CLASS A'/'nonPrecoded' codebooks $i_2$.

Therefore, given a precoding codebook (a set of precoding matrices), a UE measures a CSI-RS in a subframe designated to carry CSI-RS, calculates/determines a CSI (including PMI, RI, and CQI where each of these three CSI parameters can consist of multiple components) based on the measurement, and reports the calculated CSI to a serving eNB. In particular, this PMI is an index of a recommended precoding matrix in the precoding codebook. Similar to that for the first type, different precoding codebooks can be used for different values of RI. The measured CSI-RS can be one of the two types: non-precoded (NP) CSI-RS and beamformed (BF) CSI-RS. As mentioned, in Rel. 13, the support of these two types of CSI-RS is given in terms of two eMIMO-Types: 'CLASS A' (with one CSI-RS resource) and 'CLASS B' (with one or a plurality of CSI-RS resources), respectively.

In scenarios where DL long-term channel statistics can be measured through UL signals at a serving eNB, UE-specific BF CSI-RS can be readily used. This is typically feasible when UL-DL duplex distance is sufficiently small. When this condition does not hold, however, some UE feedback is necessary for the eNB to obtain an estimate of DL long-term channel statistics (or any of representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In LTE specification, the aforementioned precoding codebooks are utilized for CSI reporting. Two schemes of CSI reporting modes are supported (e.g., PUSCH-based aperiodic CSI (A-CSI) and PUCCH-based periodic CSI (P-CSI)). In each scheme, different modes are defined based on frequency selectivity of CQI and/or PMI, that is, whether wideband or subband reporting is performed. The supported CSI reporting modes are given in TABLE 1.

TABLE 1

CQI and PMI Feedback Types for PUSCH CSI reporting Modes

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | Mode 3-2 |

TABLE 2

CQI and PMI Feedback Types for PUCCH CSI reporting Modes

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

According to the WI, the hybrid CSI reporting based on non-precoded and beamformed CSI-RS associated with two eMIMO-Types may be supported in LTE specification.

In the present disclosure, for brevity, FDD is considered as the duplex method for both DL and UL signaling but the embodiments of the present disclosure are also directly applicable to TDD.

Throughout the present disclosure, 2D dual-polarized array is used solely for illustrative purposes, unless stated otherwise. Extensions to 2D single-polarized array are straightforward for those skilled in the art.

In the following, for brevity, FDD is considered as the duplex method for both DL and UL signaling but the embodiments of the present disclosure are also directly applicable to TDD. Terms such as 'non-precoded' (or 'NP') CSI-RS and 'beamformed' (or 'BF') CSI-RS are used throughout this present disclosure. The essence of this present disclosure does not change when different terms or names are used to refer to these two CSI-RS types. The same holds for CSI-RS resource. CSI-RS resources associated with these two types of CSI-RS can be referred to as 'a first CSI-RS resource' and 'a second CSI-RS resource', or 'CSI-RS-A resource' and 'CSI-RS-B resource'. Subsequently, the labels 'NP' and 'BF' (or 'np' and 'bf') are exemplary and can be substituted with other labels such as '1' and '2', 'A' or 'B'. Alternatively, instead of using categories such as CSI-RS type or CSI-RS resource type, a category of CSI reporting class can also be used. For instance, NP CSI-RS is associated with eMIMO-Type of 'CLASS A' while UE-specific BF CSI-RS is associated with eMIMO-Type of 'CLASS B' with one CSI-RS resource.

Throughout this present disclosure, 2D dual-polarized array is used solely for illustrative purposes, unless stated otherwise. Extensions to 2D single-polarized array are straightforward for those skilled in the art.

FIG. 12 illustrates an example dual-polarized antenna port layouts for {2, 4, 8, 12, 16} ports 1200 according to embodiments of the present disclosure. An embodiment of the dual-polarized antenna port layouts for {2, 4, 8, 12, 16} ports 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

As shown in FIG. 12, 2D antenna arrays are constructed from $N_1 \times N_2$ dual-polarized antenna elements arranged in a $(N_1, N_2)$ rectangular format for 2, 4, 8, 12, 16 antenna ports. In FIG. 12, each antenna element is logically mapped onto a single antenna port. In general, one antenna port may correspond to multiple antenna elements (physical antennas) combined via a virtualization. This $N_1 \times N_2$ dual polarized array can then be viewed as $2N_1N_2$-element array of elements.

The first dimension consists of $N_1$ columns and facilitates azimuth beamforming. The second dimension similarly consists of $N_2$ rows and allows elevation beamforming. MIMO precoding in LTE specification was largely designed to offer precoding (beamforming) gain for one-dimensional (1D) antenna array using 2, 4, 8 antenna ports, which correspond to $(N_1, N_2)$ belonging to $\{(1, 1), (2, 1), (4, 1)\}$. While fixed beamforming (i.e. antenna virtualization) can be implemented across the elevation dimension, it is unable to reap the potential gain offered by the spatial and frequency selective nature of the channel. Therefore, MIMO precoding in LTE specification is designed to offer precoding gain for two-dimensional (2D) antenna array using 8, 12, 16 antenna ports, which correspond to $(N_1, N_2)$ belonging to $\{(2, 2), (2, 3), (3, 2), (8, 1), (4, 2), (2, 4)\}$.

Although $(N_1, N_2)=(6, 1)$ case has not been supported in LTE specification, it may be supported in future releases. The embodiments of the present disclosure are general and are applicable to any $(N_1, N_2)$ values including $(N_1, N_2)=(6, 1)$. The first and second dimensions as shown in FIG. 12 are for illustration only. The present disclosure is applicable to the case, in which the first and second dimensions are swapped, i.e., first and second dimensions respectively correspond to elevation and azimuth or any other pair of directions.

FIG. 13 illustrates an example dual-polarized antenna port layouts 1300 for $\{20, 24, 28, 32\}$ ports according to embodiments of the present disclosure. An embodiment of the dual-polarized antenna port layouts 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

For 8 antenna ports $\{15,16,17,18,19,20,21,22\}$, 12 antenna ports $\{15,16,17,18,19,20,21,22,23,24,25,26\}$, 16 antenna ports $\{15,16,17,18,19,20,21,22,23,24,25,26,27,28,29,30\}$, and UE is configured with higher layer parameter eMIMO-Type, and eMIMO-Type is set to 'CLASS A', each PMI value corresponds to three codebook indices given in Table 4 for rank 1 and for rank 2-8 in LTE specification, where the quantities $\varphi_n$, $u_m$ and $v_{l,m}$ are given by equation (2):

$$\varphi_n = e^{j\pi m/2}$$

$$u_m = \begin{bmatrix} 1 & e^{j\frac{2\pi m}{O_2 N_2}} & \ldots & e^{j\frac{2\pi m(N_2-1)}{O_2 N_2}} \end{bmatrix}$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

Equation (2)

The values of $N_1$, $N_2$, $O_1$, and $O_2$ are configured with the higher-layer parameters codebook-Config-N1, codebook-Config-N2, codebook-Over-Sampling-RateConfig-O1, and codebook-Over-Sampling-RateConfig-O2, respectively. The supported configurations of $(O_1,O_2)$ and $(N_1,N_2)$ for a given number of CSI-RS ports are given in Table 3. The number of CSI-RS ports, P, is $2N_1N_2$.

A UE is not expected to be configured with value of CodebookConfig set to 2 or 3, if the value of codebook-ConfigN2 is set to 1.

A UE may only use $i_{1,2}=0$ and shall not report $i_{1,2}$ if the value of codebookConfigN2 is set to 1.

A first PMI value $i_1$ corresponds to the codebook indices pair $\{i_{1,1}, i_{1,2}\}$ and a second PMI value $i_2$ corresponds to the codebook index $i_2$ given in Table 4.

In some cases codebook subsampling is supported. The sub-sampled codebook for PUCCH mode 2-1 for value of parameter Codebook-Config set to 2, 3, or 4 is defined in LTE specification for PUCCH Reporting Type 1a.

TABLE 3

| Supported configurations of $(O_1, O_2)$ and $(N_1, N_2)$ | | |
|---|---|---|
| Number of CSI-RS antenna ports, P | $(N_1, N_2)$ | $(O_1, O_2)$ |
| 8 | (2, 2) | (4, 4), (8, 8) |
| 12 | (2, 3) | (8, 4), (8, 8) |
|  | (3, 2) | (8, 4), (4, 4) |
| 16 | (2, 4) | (8, 4), (8, 8) |
|  | (4, 2) | (8, 4), (4, 4) |
|  | (8, 1) | (4, —), (8, —) |

TABLE 4

Codebook for 1-layer CSI reporting using antenna ports 15 to 14 + P

| Value of Codebook-Config | $i_{1,1}$ | $i_{1,2}$ | $i_2$ = 0 | 1 | 2 | 3 |
|---|---|---|---|---|---|---|
| 1 | $0, 1, \ldots, O_1 N_1 - 1$ | $0, 1, \ldots, O_2 N_2 - 1$ | $W^{(1)}_{i_{1,1}, i_{1,2}, 0}$ | $W^{(1)}_{i_{1,1}, i_{1,2}, 1}$ | $W^{(1)}_{i_{1,1}, i_{1,2}, 2}$ | $W^{(1)}_{i_{1,1}, i_{1,2}, 3}$ |

$$\text{where } W^{(1)}_{l,m,n} = \frac{1}{\sqrt{P}} \begin{bmatrix} v_{l,m} \\ \varphi_n v_{l,m} \end{bmatrix}$$

| Value of Codebook-Config | $i_{1,1}$ | $i_{1,2}$ | $i_2$ = 0 | 1 | 2 | 3 |
|---|---|---|---|---|---|---|
| 2 | $0, 1, \ldots, \frac{N_1 O_1}{2} - 1$ | $0, 1, \ldots, \frac{N_2 O_2}{2} - 1$ | $W^{(1)}_{2i_{1,1}, 2i_{1,2}, 0}$ | $W^{(1)}_{2i_{1,1}, 2i_{1,2}, 1}$ | $W^{(1)}_{2i_{1,1}, 2i_{1,2}, 2}$ | $W^{(1)}_{2i_{1,1}, 2i_{1,2}, 3}$ |

| Value of Codebook-Config | $i_{1,1}$ | $i_{1,2}$ | $i_2$ = 4 | 5 | 6 | 7 |
|---|---|---|---|---|---|---|
| 2 | $0, 1, \ldots, \frac{N_1 O_1}{2} - 1$ | $0, 1, \ldots, \frac{N_2 O_2}{2} - 1$ | $W^{(1)}_{2i_{1,1}+1, 2i_{1,2}, 0}$ | $W^{(1)}_{2i_{1,1}+1, 2i_{1,2}, 1}$ | $W^{(1)}_{2i_{1,1}+1, 2i_{1,2}, 2}$ | $W^{(1)}_{2i_{1,1}+1, 2i_{1,2}, 3}$ |

| Value of Codebook-Config | $i_{1,1}$ | $i_{1,2}$ | $i_2$ = 8 | 9 | 10 | 11 |
|---|---|---|---|---|---|---|
| 2 | $0, 1, \ldots, \frac{N_1 O_1}{2} - 1$ | $0, 1, \ldots, \frac{N_2 O_2}{2} - 1$ | $W^{(1)}_{2i_{1,1}, 2i_{1,2}+1, 0}$ | $W^{(1)}_{2i_{1,1}, 2i_{1,2}+1, 1}$ | $W^{(1)}_{2i_{1,1}, 2i_{1,2}+1, 2}$ | $W^{(1)}_{2i_{1,1}, 2i_{1,2}+1, 3}$ |

| Value of Codebook-Config | $i_{1,1}$ | $i_{1,2}$ | $i_2$ = 12 | 13 | 14 | 15 |
|---|---|---|---|---|---|---|
| 2 | $0, 1, \ldots, \frac{N_1 O_1}{2} - 1$ | $0, 1, \ldots, \frac{N_2 O_2}{2} - 1$ | $W^{(1)}_{2i_{1,1}+1, 2i_{1,2}+1, 0}$ | $W^{(1)}_{2i_{1,1}+1, 2i_{1,2}+1, 1}$ | $W^{(1)}_{2i_{1,1}+1, 2i_{1,2}+1, 2}$ | $W^{(1)}_{2i_{1,1}+1, 2i_{1,2}+1, 3}$ |

$$\text{where } W^{(1)}_{l,m,n} = \frac{1}{\sqrt{P}} \begin{bmatrix} v_{l,m} \\ \varphi_n v_{l,m} \end{bmatrix}$$

| Value of Codebook-Config | $i_{1,1}$ | $i_{1,2}$ | $i_2$ = 0 | 1 | 2 | 3 |
|---|---|---|---|---|---|---|
| 3 | $0, 1, \ldots, \frac{N_1 O_1}{2} - 1$ | $0, 1, \ldots, \frac{N_2 O_2}{2} - 1$ | $W^{(1)}_{2x, 2y, 0}$ | $W^{(1)}_{2x, 2y, 1}$ | $W^{(1)}_{2x, 2y, 2}$ | $W^{(1)}_{2x, 2y, 3}$ |

| Value of Codebook-Config | $i_{1,1}$ | $i_{1,2}$ | $i_2$ = 4 | 5 | 6 | 7 |
|---|---|---|---|---|---|---|
| 3 | $0, 1, \ldots, \frac{N_1 O_1}{2} - 1$ | $0, 1, \ldots, \frac{N_2 O_2}{2} - 1$ | $W^{(1)}_{2x+2, 2y, 0}$ | $W^{(1)}_{2x+2, 2y, 1}$ | $W^{(1)}_{2x+2, 2y, 2}$ | $W^{(1)}_{2x+2, 2y, 3}$ |

| Value of Codebook-Config | $i_{1,1}$ | $i_{1,2}$ | $i_2$ = 8 | 9 | 10 | 11 |
|---|---|---|---|---|---|---|
| 3 | $0, 1, \ldots, \frac{N_1 O_1}{2} - 1$ | $0, 1, \ldots, \frac{N_2 O_2}{2} - 1$ | $W^{(1)}_{2x+1, 2y+1, 0}$ | $W^{(1)}_{2x+1, 2y+1, 1}$ | $W^{(1)}_{2x+1, 2y+1, 2}$ | $W^{(1)}_{2x+1, 2y+1, 3}$ |

| Value of Codebook-Config | $i_{1,1}$ | $i_{1,2}$ | $i_2$ = 12 | 13 | 14 | 15 |
|---|---|---|---|---|---|---|
| 3 | $0, 1, \ldots, \frac{N_1 O_1}{2} - 1$ | $0, 1, \ldots, \frac{N_2 O_2}{2} - 1$ | $W^{(1)}_{2x+3, 2y+1, 0}$ | $W^{(1)}_{2x+3, 2y+1, 1}$ | $W^{(1)}_{2x+3, 2y+1, 2}$ | $W^{(1)}_{2x+3, 2y+1, 3}$ |

$$\text{where } x = i_{1,1},\ y = i_{1,2},\ W^{(1)}_{l,m,n} = \frac{1}{\sqrt{P}} \begin{bmatrix} v_{l,m} \\ \varphi_n v_{l,m} \end{bmatrix}, \text{ if } N_1 \geq N_2$$

TABLE 4-continued

Codebook for 1-layer CSI reporting using antenna ports 15 to 14 + P $$x = i_{1,2}, y = i_{1,1}, W^{(1)}_{l,m,n} = \frac{1}{\sqrt{P}} \begin{bmatrix} v_{m,l} \\ \varphi_n v_{m,l} \end{bmatrix}, \text{ if } N_1 < N_2$$

| Value of Codebook-Config | $i_{1,1}$ | $i_{1,2}$ | $i_2$ | | | |
|---|---|---|---|---|---|---|
| | | | 0 | 1 | 2 | 3 |
| 4 | $0, 1, \ldots, \frac{N_1 O_1}{2} - 1$ | $0, 1, \ldots, \frac{N_2 O_2}{2} - 1$ | $W^{(1)}_{2x,2y,0}$ | $W^{(1)}_{2x,2y,1}$ | $W^{(1)}_{2x,2y,2}$ | $W^{(1)}_{2x,2y,3}$ |

| Value of Codebook-Config | $i_{1,1}$ | $i_{1,2}$ | $i_2$ | | | |
|---|---|---|---|---|---|---|
| | | | 4 | 5 | 6 | 7 |
| 4 | $0, 1, \ldots, \frac{N_1 O_1}{2} - 1$ | $0, 1, \ldots, \frac{N_2 O_2}{2} - 1$ | $W^{(1)}_{2x+1,2y,0}$ | $W^{(1)}_{2x+1,2y,1}$ | $W^{(1)}_{2x+1,2y,2}$ | $W^{(1)}_{2x+1,2y,3}$ |

| Value of Codebook-Config | $i_{1,1}$ | $i_{1,2}$ | $i_2$ | | | |
|---|---|---|---|---|---|---|
| | | | 8 | 9 | 10 | 11 |
| 4 | $0, 1, \ldots, \frac{N_1 O_1}{2} - 1$ | $0, 1, \ldots, \frac{N_2 O_2}{2} - 1$ | $W^{(1)}_{2x+2,2y,0}$ | $W^{(1)}_{2x+2,2y,1}$ | $W^{(1)}_{2x+2,2y,2}$ | $W^{(1)}_{2x+2,2y,3}$ |

| Value of Codebook-Config | $i_{1,1}$ | $i_{1,2}$ | $i_2$ | | | |
|---|---|---|---|---|---|---|
| | | | 12 | 13 | 14 | 15 |
| 4 | $0, 1, \ldots, \frac{N_1 O_1}{2} - 1$ | $0, 1, \ldots, \frac{N_2 O_2}{2} - 1$ | $W^{(1)}_{2x+3,2y,0}$ | $W^{(1)}_{2x+3,2y,1}$ | $W^{(1)}_{2x+3,2y,2}$ | $W^{(1)}_{2x+3,2y,3}$ | where $x = i_{1,1}, y = i_{1,2}, W^{(1)}_{l,m,n} = \frac{1}{\sqrt{P}} \begin{bmatrix} v_{l,m} \\ \varphi_n v_{l,m} \end{bmatrix}, \text{ if } N_1 \geq N_2$ $$x = i_{1,2}, y = i_{1,1}, W^{(1)}_{l,m,n} = \frac{1}{\sqrt{P}} \begin{bmatrix} v_{m,l} \\ \varphi_n v_{m,l} \end{bmatrix}, \text{ if } N_1 < N_2$$

In some embodiments, the Class A codebook parameters for {20, 24, 28, 32} ports include ($N_1$, $N_2$), ($O_1$, $O_2$), and Codebook-Config, which are configured via higher-layer RRC signaling. The supported values of Codebook-Config include 1, 2, 3, and 4, which may or may not be the same as in Rel. 13. Multiple alternatives for the supported configurations of ($O_1, O_2$) and ($N_1, N_2$) are proposed in this present disclosure.

In some embodiments of 0, the set of supported values of ($N_1$, $N_2$) and ($O_1$, $O_2$) are as shown in Table 5. In this alternative, all ($N_1$, $N_2$) values (total 19 as shown in FIG. 13) are supported and the supported ($O_1$, $O_2$) values are the same as in Rel. 13 Class A (Table 3).

TABLE 5

Supported configurations of ($O_1$, $O_2$) and ($N_1$, $N_2$)

| Number of CSI-RS antenna ports, P | ($N_1$, $N_2$) | ($O_1$, $O_2$) |
|---|---|---|
| 20 | (1, 10) | (—, 4), (—, 8) |
| | (2, 5) | (8, 4), (8, 8) |
| | (5, 2) | (8, 4), (4, 4) |
| | (10, 1) | (4, —), (8, —) |
| 24 | (1, 12) | (—, 4), (—, 8) |
| | (2, 6) | (8, 4), (8, 8) |
| | (3, 4) | (8, 4), (8, 8) |
| | (4, 3) | (8, 4), (4, 4) |
| | (6, 2) | (8, 4), (4, 4) |
| | (12, 1) | (4, —), (8, —) |

TABLE 5-continued

Supported configurations of ($O_1$, $O_2$) and ($N_1$, $N_2$)

| Number of CSI-RS antenna ports, P | ($N_1$, $N_2$) | ($O_1$, $O_2$) |
|---|---|---|
| 28 | (1, 14) | (—, 4), (—, 8) |
| | (2, 7) | (8, 4), (8, 8) |
| | (7, 2) | (8, 4), (4, 4) |
| | (14, 1) | (4, —), (8, —) |
| 32 | (1, 16) | (—, 4), (—, 8) |
| | (2, 8) | (8, 4), (8, 8) |
| | (4, 4) | (4, 4), (8, 8) |
| | (8, 2) | (8, 4), (4, 4) |
| | (16, 1) | (4, —), (8, —) |

In some embodiments of 1, the set of supported values of ($N_1$, $N_2$) and ($O_1$, $O_2$) are shown in Table 6. In this alternative, all ($N_1$, $N_2$) values except ($N_1$, $N_2$) with $N_1=1$ (total 15 as shown in FIG. 13) are supported and the supported ($O_1$, $O_2$) values are the same as in Rel. 13 Class A (Table 3).

TABLE 6

Supported configurations of ($O_1$, $O_2$) and ($N_1$, $N_2$)

| Number of CSI-RS antenna ports, P | ($N_1$, $N_2$) | ($O_1$, $O_2$) |
|---|---|---|
| 20 | (2, 5) | (8, 4), (8, 8) |
| | (5, 2) | (8, 4), (4, 4) |
| | (10, 1) | (4, —), (8, —) |

TABLE 6-continued

Supported configurations of $(O_1, O_2)$ and $(N_1, N_2)$

| Number of CSI-RS antenna ports, P | $(N_1, N_2)$ | $(O_1, O_2)$ |
|---|---|---|
| 24 | (2, 6) | (8, 4), (8, 8) |
|  | (3, 4) | (8, 4), (8, 8) |
|  | (4, 3) | (8, 4), (4, 4) |
|  | (6, 2) | (8, 4), (4, 4) |
|  | (12, 1) | (4, —), (8, —) |
| 28 | (2, 7) | (8, 4), (8, 8) |
|  | (7, 2) | (8, 4), (4, 4) |
|  | (14, 1) | (4, —), (8, —) |
| 32 | (2, 8) | (8, 4), (8, 8) |
|  | (4, 4) | (4, 4), (8, 8) |
|  | (8, 2) | (8, 4), (4, 4) |
|  | (16, 1) | (4, —), (8, —) |

In such embodiments of 1, other examples of supported values of $(N_1, N_2)$ and $(O_1, O_2)$ are shown in Table 7-Table 13.

TABLE 7

Supported configurations of $(O_1, O_2)$ and $(N_1, N_2)$

| Number of CSI-RS antenna ports, P | $(N_1, N_2)$ | $(O_1, O_2)$ |
|---|---|---|
| 20 | (2, 5) | (8, 4), (4, 4) |
|  | (5, 2) | (8, 4), (4, 4) |
|  | (10, 1) | (4, —), (8, —) |
| 24 | (2, 6) | (8, 4), (4, 4) |
|  | (3, 4) | (8, 4), (4, 4) |
|  | (4, 3) | (8, 4), (4, 4) |
|  | (6, 2) | (8, 4), (4, 4) |
|  | (12, 1) | (4, —), (8, —) |
| 28 | (2, 7) | (8, 4), (4, 4) |
|  | (7, 2) | (8, 4), (4, 4) |
|  | (14, 1) | (4, —), (8, —) |
| 32 | (2, 8) | (8, 4), (4, 4) |
|  | (4, 4) | (8, 8), (4, 4) |
|  | (8, 2) | (8, 4), (4, 4) |
|  | (16, 1) | (4, —), (8, —) |

TABLE 8

Supported configurations of $(O_1, O_2)$ and $(N_1, N_2)$

| Number of CSI-RS antenna ports, P | $(N_1, N_2)$ | $(O_1, O_2)$ |
|---|---|---|
| 20 | (2, 5) | (8, 4), (4, 4) |
|  | (5, 2) | (8, 4) |
|  | (10, 1) | (4, —), (8, —) |
| 24 | (2, 6) | (8, 4), (4, 4) |
|  | (3, 4) | (8, 4), (4, 4) |
|  | (4, 3) | (8, 4) |
|  | (6, 2) | (8, 4) |
|  | (12, 1) | (4, —), (8, —) |
| 28 | (2, 7) | (8, 4), (4, 4) |
|  | (7, 2) | (8, 4) |
|  | (14, 1) | (4, —), (8, —) |
| 32 | (2, 8) | (8, 4), (4, 4) |
|  | (4, 4) | (8, 8), (4, 4) |
|  | (8, 2) | (8, 4) |
|  | (16, 1) | (4, —), (8, —) |

TABLE 9

Supported configurations of $(O_1, O_2)$ and $(N_1, N_2)$

| Number of CSI-RS antenna ports, P | $(N_1, N_2)$ | $(O_1, O_2)$ |
|---|---|---|
| 20 | (2, 5) | (8, 4) |
|  | (5, 2) | (8, 4), (4, 4) |
|  | (10, 1) | (4, —), (8, —) |
| 24 | (2, 6) | (8, 4) |
|  | (3, 4) | (8, 4) |
|  | (4, 3) | (8, 4), (4, 4) |
|  | (6, 2) | (8, 4), (4, 4) |
|  | (12, 1) | (4, —), (8, —) |
| 28 | (2, 7) | (8, 4) |
|  | (7, 2) | (8, 4), (4, 4) |
|  | (14, 1) | (4, —), (8, —) |
| 32 | (2, 8) | (8, 4) |
|  | (4, 4) | (8, 8), (4, 4) |
|  | (8, 2) | (8, 4), (4, 4) |
|  | (16, 1) | (4, —), (8, —) |

TABLE 10

Supported configurations of $(O_1, O_2)$ and $(N_1, N_2)$

| Number of CSI-RS antenna ports, P | $(N_1, N_2)$ | $(O_1, O_2)$ |
|---|---|---|
| 20 | (2, 5) | (8, 4) |
|  | (5, 2) | (8, 4) |
|  | (10, 1) | (4, —), (8, —) |
| 24 | (2, 6) | (8, 4) |
|  | (3, 4) | (8, 4) |
|  | (4, 3) | (8, 4) |
|  | (6, 2) | (8, 4) |
|  | (12, 1) | (4, —), (8, —) |
| 28 | (2, 7) | (8, 4) |
|  | (7, 2) | (8, 4) |
|  | (14, 1) | (4, —), (8, —) |
| 32 | (2, 8) | (8, 4) |
|  | (4, 4) | (8, 8) |
|  | (8, 2) | (8, 4) |
|  | (16, 1) | (4, —), (8, —) |

TABLE 11

Supported configurations of $(O_1, O_2)$ and $(N_1, N_2)$

| Number of CSI-RS antenna ports, P | $(N_1, N_2)$ | $(O_1, O_2)$ |
|---|---|---|
| 20 | (2, 5) | (4, 4) |
|  | (5, 2) | (4, 4) |
|  | (10, 1) | (4, —), (8, —) |
| 24 | (2, 6) | (4, 4) |
|  | (3, 4) | (4, 4) |
|  | (4, 3) | (4, 4) |
|  | (6, 2) | (4, 4) |
|  | (12, 1) | (4, —), (8, —) |
| 28 | (2, 7) | (4, 4) |
|  | (7, 2) | (4, 4) |
|  | (14, 1) | (4, —), (8, —) |
| 32 | (2, 8) | (4, 4) |
|  | (4, 4) | (4, 4) |
|  | (8, 2) | (4, 4) |
|  | (16, 1) | (4, —), (8, —) |

TABLE 12

Supported configurations of $(O_1, O_2)$ and $(N_1, N_2)$

| Number of CSI-RS antenna ports, P | $(N_1, N_2)$ | $(O_1, O_2)$ |
|---|---|---|
| 20 | (2, 5) | (8, 4) |
|  | (5, 2) | (8, 4) |
|  | (10, 1) | (4, —) |
| 24 | (2, 6) | (8, 4) |
|  | (3, 4) | (8, 4) |
|  | (4, 3) | (8, 4) |
|  | (6, 2) | (8, 4) |
|  | (12, 1) | (4, —) |
| 28 | (2, 7) | (8, 4) |
|  | (7, 2) | (8, 4) |
|  | (14, 1) | (4, —) |
| 32 | (2, 8) | (8, 4) |
|  | (4, 4) | (8, 8) |
|  | (8, 2) | (8, 4) |
|  | (16, 1) | (4, —) |

TABLE 13

Supported configurations of $(O_1, O_2)$ and $(N_1, N_2)$

| Number of CSI-RS antenna ports, P | $(N_1, N_2)$ | $(O_1, O_2)$ |
|---|---|---|
| 20 | (2, 5) | (4, 4) |
|  | (5, 2) | (4, 4) |
|  | (10, 1) | (4, —) |
| 24 | (2, 6) | (4, 4) |
|  | (3, 4) | (4, 4) |
|  | (4, 3) | (4, 4) |
|  | (6, 2) | (4, 4) |
|  | (12, 1) | (4, —) |
| 28 | (2, 7) | (4, 4) |
|  | (7, 2) | (4, 4) |
|  | (14, 1) | (4, —) |
| 32 | (2, 8) | (4, 4) |
|  | (4, 4) | (4, 4) |
|  | (8, 2) | (4, 4) |
|  | (16, 1) | (4, —) |

In some embodiments of 2, the set of supported values of $(N_1, N_2)$ and $(O_1, O_2)$ as shown in Table 14. In this alternative, all $(N_1, N_2)$ $N_1 \geq N_2$ (total 10 as shown in FIG. 13) are supported and the supported $(O_1, O_2)$ values are the same as in Rel. 13 Class A (Table 3).

TABLE 14

Supported configurations of $(O_1, O_2)$ and $(N_1, N_2)$

| Number of CSI-RS antenna ports, P | $(N_1, N_2)$ | $(O_1, O_2)$ |
|---|---|---|
| 20 | (5, 2) | (8, 4), (4, 4) |
|  | (10, 1) | (4, —), (8, —) |
| 24 | (4, 3) | (8, 4), (4, 4) |
|  | (6, 2) | (8, 4), (4, 4) |
|  | (12, 1) | (4, —), (8, —) |
| 28 | (7, 2) | (8, 4), (4, 4) |
|  | (14, 1) | (4, —), (8, —) |
| 32 | (4, 4) | (4, 4), (8, 8) |
|  | (8, 2) | (8, 4), (4, 4) |
|  | (16, 1) | (4, —), (8, —) |

In such embodiments of 2, other examples of supported values of $(N_1, N_2)$ and $(O_1, O_2)$ are shown in Table 15-Table 19.

TABLE 15

Supported configurations of $(O_1, O_2)$ and $(N_1, N_2)$

| Number of CSI-RS antenna ports, P | $(N_1, N_2)$ | $(O_1, O_2)$ |
|---|---|---|
| 20 | (5, 2) | (4, 8), (4, 4) |
|  | (10, 1) | (4, —), (8, —) |
| 24 | (4, 3) | (4, 8), (4, 4) |
|  | (6, 2) | (4, 8), (4, 4) |
|  | (12, 1) | (4, —), (8, —) |
| 28 | (7, 2) | (4, 8), (4, 4) |
|  | (14, 1) | (4, —), (8, —) |
| 32 | (4, 4) | (4, 4), (8, 8) |
|  | (8, 2) | (4, 8), (4, 4) |
|  | (16, 1) | (4, —), (8, —) |

TABLE 16

Supported configurations of $(O_1, O_2)$ and $(N_1, N_2)$

| Number of CSI-RS antenna ports, P | $(N_1, N_2)$ | $(O_1, O_2)$ |
|---|---|---|
| 20 | (5, 2) | (8, 4) |
|  | (10, 1) | (4, —), (8, —) |
| 24 | (4, 3) | (8, 4) |
|  | (6, 2) | (8, 4) |
|  | (12, 1) | (4, —), (8, —) |
| 28 | (7, 2) | (8, 4) |
|  | (14, 1) | (4, —), (8, —) |
| 32 | (4, 4) | (8, 8) |
|  | (8, 2) | (8, 4) |
|  | (16, 1) | (4, —), (8, —) |

TABLE 17

Supported configurations of $(O_1, O_2)$ and $(N_1, N_2)$

| Number of CSI-RS antenna ports, P | $(N_1, N_2)$ | $(O_1, O_2)$ |
|---|---|---|
| 20 | (5, 2) | (4, 4) |
|  | (10, 1) | (4, —), (8, —) |
| 24 | (4, 3) | (4, 4) |
|  | (6, 2) | (4, 4) |
|  | (12, 1) | (4, —), (8, —) |
| 28 | (7, 2) | (4, 4) |
|  | (14, 1) | (4, —), (8, —) |
| 32 | (4, 4) | (4, 4) |
|  | (8, 2) | (4, 4) |
|  | (16, 1) | (4, —), (8, —) |

TABLE 18

Supported configurations of $(O_1, O_2)$ and $(N_1, N_2)$

| Number of CSI-RS antenna ports, P | $(N_1, N_2)$ | $(O_1, O_2)$ |
|---|---|---|
| 20 | (5, 2) | (8, 4) |
|  | (10, 1) | (8, —) |
| 24 | (4, 3) | (8, 4) |
|  | (6, 2) | (8, 4) |
|  | (12, 1) | (8, —) |
| 28 | (7, 2) | (8, 4) |
|  | (14, 1) | (8, —) |
| 32 | (4, 4) | (8, 8) |
|  | (8, 2) | (8, 4) |
|  | (16, 1) | (8, —) |

TABLE 19

Supported configurations of $(O_1, O_2)$ and $(N_1, N_2)$

| Number of CSI-RS antenna ports, P | $(N_1, N_2)$ | $(O_1, O_2)$ |
|---|---|---|
| 20 | (5, 2) | (4, 4) |
|  | (10, 1) | (4, —) |
| 24 | (4, 3) | (4, 4) |
|  | (6, 2) | (4, 4) |
|  | (12, 1) | (4, —) |
| 28 | (7, 2) | (4, 4) |
|  | (14, 1) | (4, —) |
| 32 | (4, 4) | (4, 4) |
|  | (8, 2) | (4, 4) |
|  | (16, 1) | (4, —) |

In some embodiments of 3, a subset of values of $(N_1, N_2)$ in the aforementioned embodiments 0, 1, and 2 are supported (Table 5-Table 19). In one example of 0, none of the four 1D port layouts, i.e., $(N_1, N_2)$=(10, 1), (12, 1), (14, 1), (16, 1) in the embodiments of 1 or 2 is supported. In another example of 1, one of the four 1D port layouts, i.e., $(N_1, N_2)$=(10, 1), (12, 1), (14, 1), (16, 1) in the embodiments of 1 or 2 is supported. The supported 1D layout is (16, 1). In yet another example of 2, two of the four 1D port layouts, i.e., $(N_1, N_2)$=(10, 1), (12, 1), (14, 1), (16, 1) in the embodiments of 1 or 2 are supported. The supported 1D layouts are (12, 1) and (16, 1). The supported configurations of $(O_1, O_2)$ and $(N_1, N_2)$ in this alternative is obtained by deleting the row (or rows) for $(N_1, N_2)$ value (or values) that is (or are) not supported in one of Table 5-Table 19. A few example tables are shown in Table 20-Table 25, where each table has three alternatives for Example 0, Example 1, and Example 2 the aforementioned above.

TABLE 20

Supported configurations of $(O_1, O_2)$ and $(N_1, N_2)$

| Number of CSI-RS antenna ports, P | $(N_1, N_2)$ | $(O_1, O_2)$ |
|---|---|---|
| Alternative 1-0-0 | | |
| 20 | (2, 5) | (8, 4), (4, 4) |
|  | (5, 2) | (8, 4), (4, 4) |
| 24 | (2, 6) | (8, 4), (4, 4) |
|  | (3, 4) | (8, 4), (4, 4) |
|  | (4, 3) | (8, 4), (4, 4) |
|  | (6, 2) | (8, 4), (4, 4) |
| 28 | (2, 7) | (8, 4), (4, 4) |
|  | (7, 2) | (8, 4), (4, 4) |
| 32 | (2, 8) | (8, 4), (4, 4) |
|  | (4, 4) | (8, 8), (4, 4) |
|  | (8, 2) | (8, 4), (4, 4) |
| Alternative 1-0-1 | | |
| 20 | (2, 5) | (8, 4), (4, 4) |
|  | (5, 2) | (8, 4) |
| 24 | (2, 6) | (8, 4), (4, 4) |
|  | (3, 4) | (8, 4), (4, 4) |
|  | (4, 3) | (8, 4) |
|  | (6, 2) | (8, 4) |
| 28 | (2, 7) | (8, 4), (4, 4) |
|  | (7, 2) | (8, 4) |
| 32 | (2, 8) | (8, 4), (4, 4) |
|  | (4, 4) | (8, 8), (4, 4) |
|  | (8, 2) | (8, 4) |
| Alternative 1-0-0 | | |
| 20 | (2, 5) | (8, 4) |
|  | (5, 2) | (8, 4), (4, 4) |
| 24 | (2, 6) | (8, 4) |
|  | (3, 4) | (8, 4) |

TABLE 20-continued

Supported configurations of $(O_1, O_2)$ and $(N_1, N_2)$

| Number of CSI-RS antenna ports, P | $(N_1, N_2)$ | $(O_1, O_2)$ |
|---|---|---|
|  | (4, 3) | (8, 4), (4, 4) |
|  | (6, 2) | (8, 4), (4, 4) |
| 28 | (2, 7) | (8, 4) |
|  | (7, 2) | (8, 4), (4, 4) |
| 32 | (2, 8) | (8, 4) |
|  | (4, 4) | (8, 8), (4, 4) |
|  | (8, 2) | (8, 4), (4, 4) |

TABLE 21

Supported configurations of $(O_1, O_2)$ and $(N_1, N_2)$:

| Number of CSI-RS antenna ports, P | $(N_1, N_2)$ | $(O_1, O_2)$ |
|---|---|---|
| Alternative 1-1-0 | | |
| 20 | (2, 5) | (8, 4), (4, 4) |
|  | (5, 2) | (8, 4), (4, 4) |
| 24 | (2, 6) | (8, 4), (4, 4) |
|  | (3, 4) | (8, 4), (4, 4) |
|  | (4, 3) | (8, 4), (4, 4) |
|  | (6, 2) | (8, 4), (4, 4) |
| 28 | (2, 7) | (8, 4), (4, 4) |
|  | (7, 2) | (8, 4), (4, 4) |
| 32 | (2, 8) | (8, 4), (4, 4) |
|  | (4, 4) | (8, 8), (4, 4) |
|  | (8, 2) | (8, 4), (4, 4) |
|  | (16, 1) | (4, —), (8, —) |
| Alternative 1-1-1 | | |
| 20 | (2, 5) | (8, 4), (4, 4) |
|  | (5, 2) | (8, 4) |
| 24 | (2, 6) | (8, 4), (4, 4) |
|  | (3, 4) | (8, 4), (4, 4) |
|  | (4, 3) | (8, 4) |
|  | (6, 2) | (8, 4) |
| 28 | (2, 7) | (8, 4), (4, 4) |
|  | (7, 2) | (8, 4) |
| 32 | (2, 8) | (8, 4), (4, 4) |
|  | (4, 4) | (8, 8), (4, 4) |
|  | (8, 2) | (8, 4) |
|  | (16, 1) | (4, —), (8, —) |
| Alternative 1-1-2 | | |
| 20 | (2, 5) | (8, 4) |
|  | (5, 2) | (8, 4), (4, 4) |
| 24 | (2, 6) | (8, 4) |
|  | (3, 4) | (8, 4) |
|  | (4, 3) | (8, 4), (4, 4) |
|  | (6, 2) | (8, 4), (4, 4) |
| 28 | (2, 7) | (8, 4) |
|  | (7, 2) | (8, 4), (4, 4) |
| 32 | (2, 8) | (8, 4) |
|  | (4, 4) | (8, 8), (4, 4) |
|  | (8, 2) | (8, 4), (4, 4) |
|  | (16, 1) | (4, —), (8, —) |

TABLE 22

Supported configurations of $(O_1, O_2)$ and $(N_1, N_2)$:

| Number of CSI-RS antenna ports, P | $(N_1, N_2)$ | $(O_1, O_2)$ |
|---|---|---|
| Alternative 1-2-0 | | |
| 20 | (2, 5) | (8, 4), (4, 4) |
|  | (5, 2) | (8, 4), (4, 4) |

TABLE 22-continued

Supported configurations of $(O_1, O_2)$ and $(N_1, N_2)$:

| Number of CSI-RS antenna ports, P | $(N_1, N_2)$ | $(O_1, O_2)$ |
|---|---|---|
| 24 | (2, 6) | (8, 4), (4, 4) |
|  | (3, 4) | (8, 4), (4, 4) |
|  | (4, 3) | (8, 4), (4, 4) |
|  | (6, 2) | (8, 4), (4, 4) |
|  | (12, 1) | (4, —), (8, —) |
| 28 | (2, 7) | (8, 4), (4, 4) |
|  | (7, 2) | (8, 4), (4, 4) |
| 32 | (2, 8) | (8, 4), (4, 4) |
|  | (4, 4) | (8, 8), (4, 4) |
|  | (8, 2) | (8, 4), (4, 4) |
|  | (16, 1) | (4, —), (8, —) |
| Alternative 1-2-1 | | |
| 20 | (2, 5) | (8, 4), (4, 4) |
|  | (5, 2) | (8, 4) |
| 24 | (2, 6) | (8, 4), (4, 4) |
|  | (3, 4) | (8, 4), (4, 4) |
|  | (4, 3) | (8, 4) |
|  | (6, 2) | (8, 4) |
|  | (12, 1) | (4, —), (8, —) |
| 28 | (2, 7) | (8, 4), (4, 4) |
|  | (7, 2) | (8, 4) |
| 32 | (2, 8) | (8, 4), (4, 4) |
|  | (4, 4) | (8, 8), (4, 4) |
|  | (8, 2) | (8, 4) |
|  | (16, 1) | (4, —), (8, —) |
| Alternative 1-2-2 | | |
| 20 | (2, 5) | (8, 4) |
|  | (5, 2) | (8, 4), (4, 4) |
| 24 | (2, 6) | (8, 4) |
|  | (3, 4) | (8, 4) |
|  | (4, 3) | (8, 4), (4, 4) |
|  | (6, 2) | (8, 4), (4, 4) |
|  | (12, 1) | (4, —), (8, —) |
| 28 | (2, 7) | (8, 4) |
|  | (7, 2) | (8, 4), (4, 4) |
| 32 | (2, 8) | (8, 4) |
|  | (4, 4) | (8, 8), (4, 4) |
|  | (8, 2) | (8, 4), (4, 4) |
|  | (16, 1) | (4, —), (8, —) |

TABLE 23

Supported configurations of $(O_1, O_2)$ and $(N_1, N_2)$:

| Number of CSI-RS antenna ports, P | $(N_1, N_2)$ | $(O_1, O_2)$ |
|---|---|---|
| Alternative 2-0-0 | | |
| 20 | (5, 2) | (8, 4), (4, 4) |
| 24 | (4, 3) | (8, 4), (4, 4) |
|  | (6, 2) | (8, 4), (4, 4) |
| 28 | (7, 2) | (8, 4), (4, 4) |
| 32 | (4, 4) | (8, 8), (4, 4) |
|  | (8, 2) | (8, 4), (4, 4) |
| Alternative 2-0-1 | | |
| 20 | (5, 2) | (4, 8), (4, 4) |
| 24 | (4, 3) | (4, 8), (4, 4) |
|  | (6, 2) | (4, 8), (4, 4) |
| 28 | (7, 2) | (4, 8), (4, 4) |
| 32 | (4, 4) | (8, 8), (4, 4) |
|  | (8, 2) | (4, 8), (4, 4) |

TABLE 24

Supported configurations of $(O_1, O_2)$ and $(N_1, N_2)$:

| Number of CSI-RS antenna ports, P | $(N_1, N_2)$ | $(O_1, O_2)$ |
|---|---|---|
| Alternative 2-1-0 | | |
| 20 | (5, 2) | (8, 4), (4, 4) |
| 24 | (4, 3) | (8, 4), (4, 4) |
|  | (6, 2) | (8, 4), (4, 4) |
| 28 | (7, 2) | (8, 4), (4, 4) |
| 32 | (4, 4) | (8, 8), (4, 4) |
|  | (8, 2) | (8, 4), (4, 4) |
|  | (16, 1) | (4, —), (8, —) |
| Alternative 2-1-1 | | |
| 20 | (5, 2) | (4, 8), (4, 4) |
| 24 | (4, 3) | (4, 8), (4, 4) |
|  | (6, 2) | (4, 8), (4, 4) |
| 28 | (7, 2) | (4, 8), (4, 4) |
| 32 | (4, 4) | (8, 8), (4, 4) |
|  | (8, 2) | (4, 8), (4, 4) |
|  | (16, 1) | (4, —), (8, —) |

TABLE 25

Supported configurations of $(O_1, O_2)$ and $(N_1, N_2)$:

| Number of CSI-RS antenna ports, P | $(N_1, N_2)$ | $(O_1, O_2)$ |
|---|---|---|
| Alternative 2-2-0 | | |
| 20 | (5, 2) | (8, 4), (4, 4) |
| 24 | (4, 3) | (8, 4), (4, 4) |
|  | (6, 2) | (8, 4), (4, 4) |
|  | (12, 1) | (4, —), (8, —) |
| 28 | (7, 2) | (8, 4), (4, 4) |
| 32 | (4, 4) | (8, 8), (4, 4) |
|  | (8, 2) | (8, 4), (4, 4) |
|  | (16, 1) | (4, —), (8, —) |
| Alternative 2-2-1 | | |
| 20 | (5, 2) | (4, 8), (4, 4) |
| 24 | (4, 3) | (4, 8), (4, 4) |
|  | (6, 2) | (4, 8), (4, 4) |
|  | (12, 1) | (4, —), (8, —) |
| 28 | (7, 2) | (4, 8), (4, 4) |
| 32 | (4, 4) | (8, 8), (4, 4) |
|  | (8, 2) | (4, 8), (4, 4) |
|  | (16, 1) | (4, —), (8, —) |

In some embodiments of 3, the supported values of $(O_1, O_2)=(4,-)$ or/and $(8,-)$ for 1D port layouts, i.e., $(N_1, N_2)$ with $N_1=1$ or $N_2=1$, in the aforementioned embodiments of 0, 1, 2, or 3 are replaced with $(O_1, O_2)=(2,-)$ or/and $(4,-)$, according to one of the following two options: (1) Option 0: (4,-) and (8,-) are replaced with (2,-) and (4,-) respectively; and (2) Option 1: (4,-) and (8,-) are replaced with (4,-) and (2,-) respectively. The supported configurations of $(O_1, O_2)$ and $(N_1, N_2)$ in this alternative is obtained by replacing $(O_1, O_2)=(4,-), (8,-)$ with $(2,-), (4,-)$ according to one of Option 0 and Option 1 above in one of Table 5-Table 19.

In some embodiments of 5, to determine $(N_1, N_2, O_1, O_2)$ combinations, all $(N_1, N_2)$ values in Table 6 and two Rel. 13 $(O_1, O_2)$ values for each $(N_1, N_2)$ are considered. However, the total number of $(N_1, N_2, O_1, O_2)$ combinations is too many (38), and the usefulness of some of these combinations is unclear. For example, the performance difference between $(O_1, O_2)=(8, 8)$ and $(8, 4)$ may be marginal, and hence we can drop (8, 8) and obtain $(N_1, N_2, O_1, O_2)$ combinations as shown in Table 26.

TABLE 26

Supported configurations of $(O_1, O_2)$ and $(N_1, N_2)$

| Number of CSI-RS antenna ports, P | $(N_1, N_2)$ | $(O_1, O_2)$ |
|---|---|---|
| 20 | (2, 5) | (8, 4) |
|  | (5, 2) | (8, 4), (4, 4) |
|  | (10, 1) | (4, —), (8, —) |
| 24 | (2, 6) | (8, 4) |
|  | (3, 4) | (8, 4) |
|  | (4, 3) | (8, 4), (4, 4) |
|  | (6, 2) | (8, 4), (4, 4) |
|  | (12, 1) | (4, —), (8, —) |
| 28 | (2, 7) | (8, 4) |
|  | (7, 2) | (8, 4), (4, 4) |
|  | (14, 1) | (4, —), (8, —) |
| 32 | (2, 8) | (8, 4) |
|  | (4, 4) | (8, 4), (4, 4) |
|  | (8, 2) | (8, 4), (4, 4) |
|  | (16, 1) | (4, —), (8, —) |

In some embodiments of 6, some of the combinations in Table 26, in particular $(O_1, O_2)$ values, are removed. Two reasons for this are: (1) for 1D port layouts, the minimum number of ports is 10 and hence for $(O_1, O_2)=(8,-)$, we will have 80 beams in total, which is far too many. We can restrict the $O_1$ value to 4, for example. The performance difference between $(O_1, O_2)=(4,-)$ and $(8,-)$ is expected to be small. In addition to this, $O_1=8$ results in four $W_1$ beams to be quite close which may lead to channel coverage issue discussed later in the present disclosure; and (2) Instead of trying to determine oversampling factors $(O_1, O_2)$ in two dimensions, it is perhaps technically more preferable to determine the total number of beams $(O_1N_1, O_2N_2)$ necessary for reasonable performance.

To address this issue, $(N_1, N_2, O_1, O_2)$ combinations is determined as follows. For each $(N_1, N_2)$ in Table 26, we keep only those Rel. 13 $(O_1, O_2)$ value (or values) which corresponds to the number of beams, either $O_1N_1$ or $O_2N_2$, smaller than or equal to the maximum of Rel. 13 $\{O_1N_1, O_2N_2\}$ values, which is 32 for 2D port layouts and 64 for 1D port layouts. The $(N_1, N_2, O_1, O_2)$ combinations according to this proposal (the embodiments of 6-0) is summarized in Table 27. Two more alternatives (the embodiment of 6-1 and 6-2) are also shown in Table 27 which have fewer (O1, O2) values than the embodiment of 6-0. Only one of the embodiments of 6-0, 6-1, and 6-2 may be specified in the specification.

TABLE 27

Supported configurations of $(O_1, O_2)$ and $(N_1, N_2)$

| Number of CSI-RS antenna ports, P | $(N_1, N_2)$ | $(O_1, O_2)$: Embodiment 6-0 | $(O_1, O_2)$: Embodiment 6-1 | $(O_1, O_2)$: Embodiment 6-2 |
|---|---|---|---|---|
| 20 | (2, 5) | (8, 4) | (8, 4) | (8, 4) |
|  | (5, 2) | (4, 4) | (4, 4) | (4, 4) |
|  | (10, 1) | (4, —) | (4, —) | (4, —) |
| 24 | (2, 6) | (8, 4) | (8, 4) | (8, 4) |
|  | (3, 4) | (8, 4), (8, 8) | (8, 4) | (8, 4) |
|  | (4, 3) | (8, 4), (4, 4) | (8, 4), (4, 4) | (4, 4) |
|  | (6, 2) | (4, 4) | (4, 4) | (4, 4) |
|  | (12, 1) | (4, —) | (4, —) | (4, —) |
| 28 | (2, 7) | (8, 4) | (8, 4) | (8, 4) |
|  | (7, 2) | (4, 4) | (4, 4) | (4, 4) |
|  | (14, 1) | (4, —) | (4, —) | (4, —) |
| 32 | (2, 8) | (8, 4) | (8, 4) | (8, 4) |
|  | (4, 4) | (8, 4), (4, 4) | (8, 4), (4, 4) | (8, 4) |
|  | (8, 2) | (4, 4) | (4, 4) | (4, 4) |
|  | (16, 1) | (4, —) | (4, —) | (4, —) |

Alternatively, additional values of $(O_1, O_2)$ are also allowed which include at least one of $(O_1, O_2)=(2,2)$, (2,4), (4,2), (8,2), (2,8), and/or (4,8). Smaller oversampling factors can be used when the number of CSI-RS antenna ports is large. With a smaller oversampling factor, the angular coverage of the four DFT beams (for codebook-Config=2, 3, or 4) is increased. It can have the following embodiments.

In some embodiments of 1a, the oversampling factors $O_1$ and $O_2$ are configured based on the total number of CSI-RS ports, i.e., $2N_1N_2$. For instance, $O_1$ and $O_2$ belong to the set (1) {4, 8} if $2N_1N_2 \leq N_{total}$, where $(O_1, O_2)$ belongs A= {(4,-), (8,-), (-,4), (-,8), (4,4), (8,4), (4,8), (8,8)}; and (2) {2, 4} otherwise, where $(O_1, O_2)$ belongs B={(2,-), (4,-), (-,2), (-,4), (2,2), (4,2), (2,4), (4,4)}.

Two alternatives for $N_{total}=16$ and 20. A UE is configured with $(O_1, O_2)$ from

TABLE 28

Supported configurations of and: Ntotal = 20 and embodiment 1a

| Number of CSI-RS antenna ports, P | $(N_1, N_2)$ | $(O_1, O_2)$ |
|---|---|---|
| 20 | (2, 5) | (8, 4), (8, 8) |
|  | (5, 2) | (8, 4), (4, 4) |
|  | (10, 1) | (4, —), (8, —) |
| 24 | (2, 6) | (4, 2), (4, 4) |
|  | (3, 4) | (4, 2), (4, 4) |
|  | (4, 3) | (4, 2), (2, 2) |
|  | (6, 2) | (4, 2), (2, 2) |
|  | (12, 1) | (2, —), (4, —) |
| 28 | (2, 7) | (4, 2), (4, 4) |
|  | (7, 2) | (4, 2), (2, 2) |
|  | (14, 1) | (2, —), (4, —) |
| 32 | (2, 8) | (4, 2), (4, 4) |
|  | (4, 4) | (2, 2), (4, 4) |
|  | (8, 2) | (4, 2), (2, 2) |
|  | (16, 1) | (2, —), (4, —) |

In some embodiments of 1b, the oversampling factors $O_1$ and $O_2$ are configured based on the total number of CSI-RS ports, i.e., $2N_1N_2$. For instance, $O_1$ and $O_2$ belong to the set (1){4, 8} if $2N_1N_2 \leq N_{total}$, where $(O_1, O_2)$ belongs to A; and (2) {2, 4, 8}, otherwise, where $(O_1, O_2)$ belongs to AU B.

A UE is configured with $(O_1, O_2)$ from Table 29.

TABLE 29

Supported configurations of and: Ntotal = 20 and Sub-embodiment 1b

| Number of CSI-RS antenna ports, P | $(N_1, N_2)$ | $(O_1, O_2)$ |
|---|---|---|
| 20 | (2, 5) | (8, 4), (8, 8) |
|  | (5, 2) | (8, 4), (4, 4) |
|  | (10, 1) | (4, —), (8, —) |
| 24 | (2, 6) | (4, 2), (4, 4), (8, 4), (8, 8) |
|  | (3, 4) | (4, 2), (4, 4), (8, 4), (8, 8) |
|  | (4, 3) | (4, 2), (2, 2), (8, 4), (4, 4) |
|  | (6, 2) | (4, 2), (2, 2), (8, 4), (4, 4) |
|  | (12, 1) | (2, —), (4, —), (8, —) |
| 28 | (2, 7) | (4, 2), (4, 4), (8, 4), (8, 8) |
|  | (7, 2) | (4, 2), (2, 2), (8, 4), (4, 4) |
|  | (14, 1) | (2, —), (4, —), (8, —) |

TABLE 29-continued

Supported configurations of and: Ntotal = 20 and Sub-embodiment 1b

| Number of CSI-RS antenna ports, P | $(N_1, N_2)$ | $(O_1, O_2)$ |
|---|---|---|
| 32 | (2, 8) | (4, 2), (4, 4), (8, 4), (8, 8) |
|  | (4, 4) | (2, 2), (4, 4), (8, 8) |
|  | (8, 2) | (4, 2), (2, 2), (8, 4), (4, 4) |
|  | (16, 1) | (2, —), (4, —), (8, —) |

In some embodiments of 2a, the oversampling factors $O_1$ and $O_2$ are configured based on the number of CSI-RS ports $N_1$ and $N_2$, respectively. For instance, $O_1$ (or $O_2$) belong to the set: (1) $\{4, 8\}$ if $N_1$ (or $N_2$)<=N; and (2) $\{2, 4\}$ otherwise, where two alternatives for N are 4 and 5. A UE is configured with $(O_1, O_2)$ from Table 30.

TABLE 30

Supported configurations of $(O_1, O_2)$ and $(N_1, N_2)$: N = 5 and Sub-embodiment 2a

| Number of CSI-RS antenna ports, P | $(N_1, N_2)$ | $(O_1, O_2)$ |
|---|---|---|
| 20 | (2, 5) | (8, 4), (8, 8) |
|  | (5, 2) | (8, 4), (4, 4) |
|  | (10, 1) | (2, —), (4, —) |
| 24 | (2, 6) | (8, 2), (8, 4) |
|  | (3, 4) | (8, 4), (8, 8) |
|  | (4, 3) | (8, 4), (4, 4) |
|  | (6, 2) | (4, 4), (2, 4) |
|  | (12, 1) | (2, —), (4, —) |
| 28 | (2, 7) | (8, 2), (8, 4) |
|  | (7, 2) | (4, 4), (2, 4) |
|  | (14, 1) | (2, —), (4, —) |
| 32 | (2, 8) | (8, 2), (8, 4) |
|  | (4, 4) | (4, 4), (8, 8) |
|  | (8, 2) | (4, 4), (2, 4) |
|  | (16, 1) | (2, —), (4, —) |

In some embodiments of 2b, the oversampling factors $O_1$ and $O_2$ are configured based on the number of CSI-RS ports $N_1$ and $N_2$, respectively. For instance, $O_1$ (or $O_2$) belong to the set: (1) $\{4, 8\}$ if $N_1$ (or $N_2$)<=N, where; (2) $\{2, 4, 8\}$ otherwise. A UE is configured with $(O_1, O_2)$ from Table 31.

TABLE 31

Supported configurations of and: N = 5 and Sub-embodiment 2b

| Number of CSI-RS antenna ports, P | $(N_1, N_2)$ | $(O_1, O_2)$ |
|---|---|---|
| 20 | (2, 5) | (8, 4), (8, 8) |
|  | (5, 2) | (8, 4), (4, 4) |
|  | (10, 1) | (2, —), (4, —) |
| 24 | (2, 6) | (8, 2), (8, 4), (8, 8) |
|  | (3, 4) | (8, 4), (8, 8) |
|  | (4, 3) | (8, 4), (4, 4) |
|  | (6, 2) | (4, 4), (2, 4), (8, 4) |
|  | (12, 1) | (2, —), (4, —), (8, —) |
| 28 | (2, 7) | (8, 2), (8, 4), (8, 8) |
|  | (7, 2) | (4, 4), (2, 4), (8, 4) |
|  | (14, 1) | (2, —), (4, —), (8, —) |
| 32 | (2, 8) | (8, 2), (8, 4), (8, 8) |
|  | (4, 4) | (4, 4), (8, 8) |
|  | (8, 2) | (4, 4), (2, 4), (8, 4) |
|  | (16, 1) | (2, —), (4, —), (8, —) |

In some embodiments of 3, the oversampling factors $O_1$ and $O_2$ are configured based on the number of CSI-RS ports $N_1$ and $N_2$, respectively, and Codebook-Config. In particular, depending on Codebook-Config, $(i_{1,1}, i_{1,2})$ indicates different number of beams in two dimensions, as shown in FIG. 17.

For instance, in one example, $O_1$ (or $O_2$) belong to the set $\{2, 4\}$ if $N_1$ (or $N_2$)>5 and $L_1$ (or $L_2$)=4. In another example, $O_1$ (or $O_2$) belong to the set $\{4, 8\}$ otherwise.

A UE is configured with $(O_1, O_2)$ from Table 33

TABLE 33

Supported configurations of $(O_1, O_2)$ and $(N_1, N_2)$

| Number of CSI-RS antenna ports, P | $(N_1, N_2)$ | $(O_1, O_2)$ Codebook-Config 1 | Codebook-Config 2 | Codebook-Config 3 | Codebook-Config 4 |
|---|---|---|---|---|---|
| 20 | (2, 5) | (8, 4), (8, 8) | (8, 4), (8, 8) | (8, 4), (8, 8) | (8, 4), (8, 8) |
|  | (5, 2) | (8, 4), (4, 4) | (8, 4), (4, 4) | (8, 4), (4, 4) | (8, 4), (4, 4) |
|  | (10, 1) | (4, —), (8, —) | (4, —), (8, —) | (2, —), (4, —) | (2, —), (4, —) |
| 24 | (2, 6) | (8, 4), (8, 8) | (8, 4), (8, 8) | (8, 2), (8, 4) | (8, 2), (8, 4) |
|  | (3, 4) | (8, 4), (8, 8) | (8, 4), (8, 8) | (8, 4), (8, 8) | (8, 4), (8, 8) |
|  | (4, 3) | (8, 4), (4, 4) | (8, 4), (4, 4) | (8, 4), (4, 4) | (8, 4), (4, 4) |
|  | (6, 2) | (8, 4), (4, 4) | (8, 4), (4, 4) | (4, 4), (2, 4) | (4, 4), (2, 4) |
|  | (12, 1) | (4, —), (8, —) | (4, —), (8, —) | (2, —), (4, —) | (2, —), (4, —) |
| 28 | (2, 7) | (8, 4), (8, 8) | (8, 4), (8, 8) | (8, 2), (8, 4) | (8, 2), (8, 4) |
|  | (7, 2) | (8, 4), (4, 4) | (8, 4), (4, 4) | (4, 4), (2, 4) | (4, 4), (2, 4) |
|  | (14, 1) | (4, —), (8, —) | (4, —), (8, —) | (2, —), (4, —) | (2, —), (4, —) |
| 32 | (2, 8) | (8, 4), (8, 8) | (8, 4), (8, 8) | (8, 2), (8, 4) | (8, 2), (8, 4) |
|  | (4, 4) | (4, 4), (8, 8) | (4, 4), (8, 8) | (4, 4), (8, 8) | (4, 4), (8, 8) |
|  | (8, 2) | (8, 4), (4, 4) | (8, 4), (4, 4) | (4, 4), (2, 4) | (4, 4), (2, 4) |
|  | (16, 1) | (4, —), (8, —) | (4, —), (8, —) | (2, —), (4, —) | (2, —), (4, —) |

In some embodiments of 4, the oversampling factors $O_1$ and $O_2$ are configured based on the number of CSI-RS ports $N_1$ and $N_2$, respectively. For instance, $O_1$ (or $O_2$) belong to the set: (1) $\{4, 8\}$ if $N_1$ (or $N_2$)$\leq$N, and (2) $\{2, 4\}$ otherwise. For port layouts with both $N_1 \leq N$ and $N_2 \leq N$, Rel. 13 $(O_1, O_2)$ values (Table 3) are used. A few examples of values of N are 4, 5, 6, 7, and 8.

Assuming $N_1 \geq N_2$, $N_1 \geq N$, and $N_2 < N$, the candidate oversampling factors are $O_1 = \{2, 4\}$, and $O_2 = \{4, 8\}$, which implies that the set of all $(O_1, O_2)$ values is $\{(2, 4), (4, 4), (2, 8), (4,8)\}$. Out of this set, the following four alternatives can be constructed: (1) Alt 0: $(O_1, O_2) = \{(2, 4), (4, 4)\}$; (2) Alt 1: $(O_1, O_2) = \{(2, 8), (4, 4)\}$; (3) Alt 2: $(O_1, O_2) = \{(4, 4), (4, 8)\}$; and (4) Alt 3: $(O_1, O_2) = \{(2, 4), (4, 4), (2, 8), (4, 8)\}$. The summary of $(O_1, O_2)$ values according to this embodiment are shown in Table 34.

TABLE 34

Alternatives for (O1, O2)

| Alt | $N_1 \leq N$ and $N_2 \leq N$ | $N_1 \geq N > N_2$ | $N_1 < N_2$ and $N < N_2$ |
|---|---|---|---|
| 0 | Rel. 13 values: | (2, 4), (4, 4) | (4, 2), (4, 4) |
| 1 | $N_1 > N_2$ (8, 4), (4, 4) | (2, 8), (4, 4) | (8, 2), (4, 4) |
| 2 | $N_1 < N_2$ (8, 4), (8, 8) | (4, 4), (4, 8) | (4, 4), (8, 4) |
| 3 | $N_1 = N_2$ (4, 4), (8, 8) | (2, 4), (4, 4), (2, 8), (4, 8) | (4, 2), (4, 4), (8, 2), (8, 4) |

Only one of the multiple alternatives (i.e. the aforementioned embodiments 0-3) for $(O_1, O_2)$ will be specified in the specification.

Two examples $(O_1, O_2)$ and $(N_1, N_2)$ configuration tables for N=4 are shown in Table 35 and Table 36.

TABLE 35

Supported configurations of $(O_1, O_2)$ and $(N_1, N_2)$: $N_1 \geq N_2$ and N = 4

| Number of CSI-RS antenna ports, P | $(N_1, N_2)$ | |
|---|---|---|
| | | $(O_1, O_2)$: Alt 0 |
| 20 | (5, 2) | (2, 4), (4, 4) |
| | (10, 1) | (2, —), (4, —) |
| 24 | (4, 3) | (8, 4), (4, 4) |
| | (6, 2) | (2, 4), (4, 4) |
| | (12, 1) | (2, —), (4, —) |
| 28 | (7, 2) | (2, 4), (4, 4) |
| | (14, 1) | (2, —), (4, —) |
| 32 | (4, 4) | (4, 4), (8, 8) |
| | (8, 2) | (2, 4), (4, 4) |
| | (16, 1) | (2, —), (4, —) |
| | | $(O_1, O_2)$: Alt 1 |
| 20 | (5, 2) | (2, 8), (4, 4) |
| | (10, 1) | (2, —), (4, —) |
| 24 | (4, 3) | (8, 4), (4, 4) |
| | (6, 2) | (2, 8), (4, 4) |
| | (12, 1) | (2, —), (4, —) |
| 28 | (7, 2) | (2, 8), (4, 4) |
| | (14, 1) | (2, —), (4, —) |
| 32 | (4, 4) | (4, 4), (8, 8) |
| | (8, 2) | (2, 8), (4, 4) |
| | (16, 1) | (2, —), (4, —) |
| | | $(O_1, O_2)$: Alt 2 |
| 20 | (5, 2) | (4, 8), (4, 4) |
| | (10, 1) | (2, —), (4, —) |

TABLE 35-continued

Supported configurations of $(O_1, O_2)$ and $(N_1, N_2)$: $N_1 \geq N_2$ and N = 4

| Number of CSI-RS antenna ports, P | $(N_1, N_2)$ | |
|---|---|---|
| 24 | (4, 3) | (8, 4), (4, 4) |
| | (6, 2) | (4, 8), (4, 4) |
| | (12, 1) | (2, —), (4, —) |
| 28 | (7, 2) | (4, 8), (4, 4) |
| | (14, 1) | (2, —), (4, —) |
| 32 | (4, 4) | (4, 4), (8, 8) |
| | (8, 2) | (4, 8), (4, 4) |
| | (16, 1) | (2, —), (4, —) |
| | | $(O_1, O_2)$: Alt 3 |
| 20 | (5, 2) | (2, 4), (2, 8), (4, 8), (4, 4) |
| | (10, 1) | (2, —), (4, —) |
| 24 | (4, 3) | (8, 4), (4, 4) |
| | (6, 2) | (2, 4), (2, 8), (4, 8), (4, 4) |
| | (12, 1) | (2, —), (4, —) |
| 28 | (7, 2) | (2, 4), (2, 8), (4, 8), (4, 4) |
| | (14, 1) | (2, —), (4, —) |
| 32 | (4, 4) | (4, 4), (8, 8) |
| | (8, 2) | (2, 4), (2, 8), (4, 8), (4, 4) |
| | (16, 1) | (2, —), (4, —) |

TABLE 36

Supported configurations of and: N = 4

| Number of CSI-RS antenna ports, P | $(N_1, N_2)$ | |
|---|---|---|
| | | $(O_1, O_2)$: Alt 0 |
| 20 | (2, 5) | (4, 2), (4, 4) |
| | (5, 2) | (2, 4), (4, 4) |
| | (10, 1) | (2, —), (4, —) |
| 24 | (2, 6) | (4, 2), (4, 4) |
| | (3, 4) | (8, 4), (8, 8) |
| | (4, 3) | (8, 4), (4, 4) |
| | (6, 2) | (2, 4), (4, 4) |
| | (12, 1) | (2, —), (4, —) |
| 28 | (2, 7) | (4, 2), (4, 4) |
| | (7, 2) | (2, 4), (4, 4) |
| | (14, 1) | (2, —), (4, —) |
| 32 | (2, 8) | (4, 2), (4, 4) |
| | (4, 4) | (4, 4), (8, 8) |
| | (8, 2) | (2, 4), (4, 4) |
| | (16, 1) | (2, —), (4, —) |
| | | $(O_1, O_2)$: Alt 1 |
| 20 | (2, 5) | (8, 2), (4, 4) |
| | (5, 2) | (2, 8), (4, 4) |
| | (10, 1) | (2, —), (4, —) |
| 24 | (2, 6) | (8, 2), (4, 4) |
| | (3, 4) | (8, 4), (8, 8) |
| | (4, 3) | (8, 4), (4, 4) |
| | (6, 2) | (2, 8), (4, 4) |
| | (12, 1) | (2, —), (4, —) |
| 28 | (2, 7) | (8, 2), (4, 4) |
| | (7, 2) | (2, 8), (4, 4) |
| | (14, 1) | (2, —), (4, —) |
| 32 | (2, 8) | (8, 2), (4, 4) |
| | (4, 4) | (4, 4), (8, 8) |
| | (8, 2) | (2, 8), (4, 4) |
| | (16, 1) | (2, —), (4, —) |
| | | $(O_1, O_2)$: Alt 2 |
| 20 | (2, 5) | (8, 4), (4, 4) |
| | (5, 2) | (4, 8), (4, 4) |
| | (10, 1) | (2, —), (4, —) |
| 24 | (2, 6) | (8, 4), (4, 4) |
| | (3, 4) | (8, 4), (8, 8) |
| | (4, 3) | (8, 4), (4, 4) |
| | (6, 2) | (4, 8), (4, 4) |
| | (12, 1) | (2, —), (4, —) |

TABLE 36-continued

Supported configurations of and: N = 4

| Number of CSI-RS antenna ports, P | $(N_1, N_2)$ | $(O_1, O_2)$ |
|---|---|---|
| 28 | (2, 7) | (8, 4), (4, 4) |
|  | (7, 2) | (4, 8), (4, 4) |
|  | (14, 1) | (2, —), (4, —) |
| 32 | (2, 8) | (8, 4), (4, 4) |
|  | (4, 4) | (4, 4), (8, 8) |
|  | (8, 2) | (4, 8), (4, 4) |
|  | (16, 1) | (2, —), (4, —) |
| | | $(O_1, O_2)$: Alt 3 |
| 20 | (2, 5) | (4, 2), (8, 2), (8, 4), (4, 4) |
|  | (5, 2) | (2, 4), (2, 8), (4, 8), (4, 4) |
|  | (10, 1) | (2, —), (4, —) |
| 24 | (2, 6) | (4, 2), (8, 2), (8, 4), (4, 4) |
|  | (3, 4) | (8, 4), (8, 8) |
|  | (4, 3) | (8, 4), (4, 4) |
|  | (6, 2) | (2, 4), (2, 8), (4, 8), (4, 4) |
|  | (12, 1) | (2, —), (4, —) |
| 28 | (2, 7) | (4, 2), (8, 2), (8, 4), (4, 4) |
|  | (7, 2) | (2, 4), (2, 8), (4, 8), (4, 4) |
|  | (14, 1) | (2, —), (4, —) |
| 32 | (2, 8) | (4, 2), (8, 2), (8, 4), (4, 4) |
|  | (4, 4) | (4, 4), (8, 8) |
|  | (8, 2) | (2, 4), (2, 8), (4, 8), (4, 4) |
|  | (16, 1) | (2, —), (4, —) |

Two examples $(O_1, O_2)$ and $(N_1, N_2)$ configuration tables for N=5 are shown in Table 37 and Table 38.

TABLE 37

Supported configurations of and: N1 ≥ N2 and N = 5

| Number of CSI-RS antenna ports, P | $(N_1, N_2)$ | $(O_1, O_2)$ |
|---|---|---|
| | | $(O_1, O_2)$: Alt 0 |
| 20 | (5, 2) | (8, 4), (4, 4) |
|  | (10, 1) | (2, —), (4, —) |
| 24 | (4, 3) | (8, 4), (4, 4) |
|  | (6, 2) | (2, 4), (4, 4) |
|  | (12, 1) | (2, —), (4, —) |
| 28 | (7, 2) | (2, 4), (4, 4) |
|  | (14, 1) | (2, —), (4, —) |
| 32 | (4, 4) | (4, 4), (8, 8) |
|  | (8, 2) | (2, 4), (4, 4) |
|  | (16, 1) | (2, —), (4, —) |
| | | $(O_1, O_2)$: Alt 1 |
| 20 | (5, 2) | (8, 4), (4, 4) |
|  | (10, 1) | (2, —), (4, —) |
| 24 | (4, 3) | (8, 4), (4, 4) |
|  | (6, 2) | (2, 8), (4, 4) |
|  | (12, 1) | (2, —), (4, —) |
| 28 | (7, 2) | (2, 8), (4, 4) |
|  | (14, 1) | (2, —), (4, —) |
| 32 | (4, 4) | (4, 4), (8, 8) |
|  | (8, 2) | (2, 8), (4, 4) |
|  | (16, 1) | (2, —), (4, —) |
| | | $(O_1, O_2)$: Alt 2 |
| 20 | (5, 2) | (8, 4), (4, 4) |
|  | (10, 1) | (2, —), (4, —) |
| 24 | (4, 3) | (8, 4), (4, 4) |
|  | (6, 2) | (4, 8), (4, 4) |
|  | (12, 1) | (2, —), (4, —) |
| 28 | (7, 2) | (4, 8), (4, 4) |
|  | (14, 1) | (2, —), (4, —) |
| 32 | (4, 4) | (4, 4), (8, 8) |
|  | (8, 2) | (4, 8), (4, 4) |
|  | (16, 1) | (2, —), (4, —) |

TABLE 37-continued

Supported configurations of and: N1 ≥ N2 and N = 5

| Number of CSI-RS antenna ports, P | $(N_1, N_2)$ | $(O_1, O_2)$ |
|---|---|---|
| | | $(O_1, O_2)$: Alt 3 |
| 20 | (5, 2) | (8, 4), (4, 4) |
|  | (10, 1) | (2, —), (4, —) |
| 24 | (4, 3) | (8, 4), (4, 4) |
|  | (6, 2) | (2, 4), (2, 8), (4, 8), (4, 4) |
|  | (12, 1) | (2, —), (4, —) |
| 28 | (7, 2) | (2, 4), (2, 8), (4, 8), (4, 4) |
|  | (14, 1) | (2, —), (4, —) |
| 32 | (4, 4) | (4, 4), (8, 8) |
|  | (8, 2) | (2, 4), (2, 8), (4, 8), (4, 4) |
|  | (16, 1) | (2, —), (4, —) |

TABLE 38

Supported configurations of and: N = 5

| Number of CSI-RS antenna ports, P | $(N_1, N_2)$ | $(O_1, O_2)$ |
|---|---|---|
| | | $(O_1, O_2)$: Alt 0 |
| 20 | (2, 5) | (8, 4), (8, 8) |
|  | (5, 2) | (8, 4), (4, 4) |
|  | (10, 1) | (2, —), (4, —) |
| 24 | (2, 6) | (4, 2), (4, 4) |
|  | (3, 4) | (8, 4), (8, 8) |
|  | (4, 3) | (8, 4), (4, 4) |
|  | (6, 2) | (2, 4), (4, 4) |
|  | (12, 1) | (2, —), (4, —) |
| 28 | (2, 7) | (4, 2), (4, 4) |
|  | (7, 2) | (2, 4), (4, 4) |
|  | (14, 1) | (2, —), (4, —) |
| 32 | (2, 8) | (4, 2), (4, 4) |
|  | (4, 4) | (4, 4), (8, 8) |
|  | (8, 2) | (2, 4), (4, 4) |
|  | (16, 1) | (2, —), (4, —) |
| | | $(O_1, O_2)$: Alt 1 |
| 20 | (2, 5) | (8, 4), (8, 8) |
|  | (5, 2) | (8, 4), (4, 4) |
|  | (10, 1) | (2, —), (4, —) |
| 24 | (2, 6) | (8, 2), (4, 4) |
|  | (3, 4) | (8, 4), (8, 8) |
|  | (4, 3) | (8, 4), (4, 4) |
|  | (6, 2) | (2, 8), (4, 4) |
|  | (12, 1) | (2, —), (4, —) |
| 28 | (2, 7) | (8, 2), (4, 4) |
|  | (7, 2) | (2, 8), (4, 4) |
|  | (14, 1) | (2, —), (4, —) |
| 32 | (2, 8) | (8, 2), (4, 4) |
|  | (4, 4) | (4, 4), (8, 8) |
|  | (8, 2) | (2, 8), (4, 4) |
|  | (16, 1) | (2, —), (4, —) |
| | | $(O_1, O_2)$: Alt 2 |
| 20 | (2, 5) | (8, 4), (8, 8) |
|  | (5, 2) | (8, 4), (4, 4) |
|  | (10, 1) | (2, —), (4, —) |
| 24 | (2, 6) | (8, 4), (4, 4) |
|  | (3, 4) | (8, 4), (8, 8) |
|  | (4, 3) | (8, 4), (4, 4) |
|  | (6, 2) | (4, 8), (4, 4) |
|  | (12, 1) | (2, —), (4, —) |
| 28 | (2, 7) | (8, 4), (4, 4) |
|  | (7, 2) | (4, 8), (4, 4) |
|  | (14, 1) | (2, —), (4, —) |
| 32 | (2, 8) | (8, 4), (4, 4) |
|  | (4, 4) | (4, 4), (8, 8) |
|  | (8, 2) | (4, 8), (4, 4) |
|  | (16, 1) | (2, —), (4, —) |

TABLE 38-continued

Supported configurations of and: N = 5

| Number of CSI-RS antenna ports, P | (N₁, N₂) | (O₁, O₂): Alt 3 |
|---|---|---|
| 20 | (2, 5) | (8, 4), (8, 8) |
|  | (5, 2) | (8, 4), (4, 4) |
|  | (10, 1) | (2, —), (4, —) |
| 24 | (2, 6) | (4, 2), (8, 2), (8, 4), (4, 4) |
|  | (3, 4) | (8, 4), (8, 8) |
|  | (4, 3) | (8, 4), (4, 4) |
|  | (6, 2) | (2, 4), (2, 8), (4, 8), (4, 4) |
|  | (12, 1) | (2, —), (4, —) |
| 28 | (2, 7) | (4, 2), (8, 2), (8, 4), (4, 4) |
|  | (7, 2) | (2, 4), (2, 8), (4, 8), (4, 4) |
|  | (14, 1) | (2, —), (4, —) |
| 32 | (2, 8) | (4, 2), (8, 2), (8, 4), (4, 4) |
|  | (4, 4) | (4, 4), (8, 8) |
|  | (8, 2) | (2, 4), (2, 8), (4, 8), (4, 4) |
|  | (16, 1) | (2, —), (4, —) |

Two examples $(O_1, O_2)$ and $(N_1, N_2)$ configuration tables for N=6 are shown in Table 39 and Table 40.

TABLE 39

Supported configurations of $(O_1, O_2)$ and $(N_1, N_2)$: $N_1 \geq N_2$ and N = 6

| Number of CSI-RS antenna ports, P | (N₁, N₂) | |
|---|---|---|
|  |  | (O₁, O₂): Alt 0 |
| 20 | (5, 2) | (8, 4), (4, 4) |
|  | (10, 1) | (2, —), (4, —) |
| 24 | (4, 3) | (8, 4), (4, 4) |
|  | (6, 2) | (8, 4), (4, 4) |
|  | (12, 1) | (2, —), (4, —) |
| 28 | (7, 2) | (2, 4), (4, 4) |
|  | (14, 1) | (2, —), (4, —) |
| 32 | (4, 4) | (4, 4), (8, 8) |
|  | (8, 2) | (2, 4), (4, 4) |
|  | (16, 1) | (2, —), (4, —) |
|  |  | (O₁, O₂): Alt 1 |
| 20 | (5, 2) | (8, 4), (4, 4) |
|  | (10, 1) | (2, —), (4, —) |
| 24 | (4, 3) | (8, 4), (4, 4) |
|  | (6, 2) | (8, 4), (4, 4) |
|  | (12, 1) | (2, —), (4, —) |
| 28 | (7, 2) | (2, 8), (4, 4) |
|  | (14, 1) | (2, —), (4, —) |
| 32 | (4, 4) | (4, 4), (8, 8) |
|  | (8, 2) | (2, 8), (4, 4) |
|  | (16, 1) | (2, —), (4, —) |
|  |  | (O₁, O₂): Alt 2 |
| 20 | (5, 2) | (8, 4), (4, 4) |
|  | (10, 1) | (2, —), (4, —) |
| 24 | (4, 3) | (8, 4), (4, 4) |
|  | (6, 2) | (8, 4), (4, 4) |
|  | (12, 1) | (2, —), (4, —) |
| 28 | (7, 2) | (4, 8), (4, 4) |
|  | (14, 1) | (2, —), (4, —) |
| 32 | (4, 4) | (4, 4), (8, 8) |
|  | (8, 2) | (4, 8), (4, 4) |
|  | (16, 1) | (2, —), (4, —) |
|  |  | (O₁, O₂): Alt 3 |
| 20 | (5, 2) | (8, 4), (4, 4) |
|  | (10, 1) | (2, —), (4, —) |
| 24 | (4, 3) | (8, 4), (4, 4) |
|  | (6, 2) | (8, 4), (4, 4) |
|  | (12, 1) | (2, —), (4, —) |

TABLE 39-continued

Supported configurations of $(O_1, O_2)$ and $(N_1, N_2)$: $N_1 \geq N_2$ and N = 6

| Number of CSI-RS antenna ports, P | (N₁, N₂) | |
|---|---|---|
| 28 | (7, 2) | (2, 4), (2, 8), (4, 8), (4, 4) |
|  | (14, 1) | (2, —), (4, —) |
| 32 | (4, 4) | (4, 4), (8, 8) |
|  | (8, 2) | (2, 4), (2, 8), (4, 8), (4, 4) |
|  | (16, 1) | (2, —), (4, —) |

TABLE 40

Supported configurations of and: N = 6

| Number of CSI-RS antenna ports, P | (N₁, N₂) | |
|---|---|---|
|  |  | (O₁, O₂): Alt 0 |
| 20 | (2, 5) | (8, 4), (8, 8) |
|  | (5, 2) | (8, 4), (4, 4) |
|  | (10, 1) | (2, —), (4, —) |
| 24 | (2, 6) | (8, 4), (8, 8) |
|  | (3, 4) | (8, 4), (8, 8) |
|  | (4, 3) | (8, 4), (4, 4) |
|  | (6, 2) | (8, 4), (4, 4) |
|  | (12, 1) | (2, —), (4, —) |
| 28 | (2, 7) | (4, 2), (4, 4) |
|  | (7, 2) | (2, 4), (4, 4) |
|  | (14, 1) | (2, —), (4, —) |
| 32 | (2, 8) | (4, 2), (4, 4) |
|  | (4, 4) | (4, 4), (8, 8) |
|  | (8, 2) | (2, 4), (4, 4) |
|  | (16, 1) | (2, —), (4, —) |
|  |  | (O₁, O₂): Alt 1 |
| 20 | (2, 5) | (8, 4), (8, 8) |
|  | (5, 2) | (8, 4), (4, 4) |
|  | (10, 1) | (2, —), (4, —) |
| 24 | (2, 6) | (8, 4), (8, 8) |
|  | (3, 4) | (8, 4), (8, 8) |
|  | (4, 3) | (8, 4), (4, 4) |
|  | (6, 2) | (8, 4), (4, 4) |
|  | (12, 1) | (2, —), (4, —) |
| 28 | (2, 7) | (8, 2), (4, 4) |
|  | (7, 2) | (2, 8), (4, 4) |
|  | (14, 1) | (2, —), (4, —) |
| 32 | (2, 8) | (8, 2), (4, 4) |
|  | (4, 4) | (4, 4), (8, 8) |
|  | (8, 2) | (2, 8), (4, 4) |
|  | (16, 1) | (2, —), (4, —) |
|  |  | (O₁, O₂): Alt 2 |
| 20 | (2, 5) | (8, 4), (8, 8) |
|  | (5, 2) | (8, 4), (4, 4) |
|  | (10, 1) | (2, —), (4, —) |
| 24 | (2, 6) | (8, 4), (8, 8) |
|  | (3, 4) | (8, 4), (8, 8) |
|  | (4, 3) | (8, 4), (4, 4) |
|  | (6, 2) | (8, 4), (4, 4) |
|  | (12, 1) | (2, —), (4, —) |
| 28 | (2, 7) | (8, 4), (4, 4) |
|  | (7, 2) | (4, 8), (4, 4) |
|  | (14, 1) | (2, —), (4, —) |
| 32 | (2, 8) | (8, 4), (4, 4) |
|  | (4, 4) | (4, 4), (8, 8) |
|  | (8, 2) | (4, 8), (4, 4) |
|  | (16, 1) | (2, —), (4, —) |
|  |  | (O₁, O₂): Alt 3 |
| 20 | (2, 5) | (8, 4), (8, 8) |
|  | (5, 2) | (8, 4), (4, 4) |
|  | (10, 1) | (2, —), (4, —) |
| 24 | (2, 6) | (8, 4), (8, 8) |
|  | (3, 4) | (8, 4), (8, 8) |
|  | (4, 3) | (8, 4), (4, 4) |

TABLE 40-continued

Supported configurations of and: N = 6

| Number of CSI-RS antenna ports, P | $(N_1, N_2)$ | |
|---|---|---|
| | (6, 2) | (8, 4), (4, 4) |
| | (12, 1) | (2, —), (4, —) |
| 28 | (2, 7) | (4, 2), (8, 2), (8, 4), (4, 4) |
| | (7, 2) | (2, 4), (2, 8), (4, 8), (4, 4) |
| | (14, 1) | (2, —), (4, —) |
| 32 | (2, 8) | (4, 2), (8, 2), (8, 4), (4, 4) |
| | (4, 4) | (4, 4), (8, 8) |
| | (8, 2) | (2, 4), (2, 8), (4, 8), (4, 4) |
| | (16, 1) | (2, —), (4, —) |

Two examples $(O_1, O_2)$ and $(N_1, N_2)$ configuration tables for N=7 are shown in Table 41 and Table 42.

TABLE 41

Supported configurations of and: N1 ≥ N2 and N = 7

| Number of CSI-RS antenna ports, P | $(N_1, N_2)$ | |
|---|---|---|
| | | $(O_1, O_2)$: Alt 0 |
| 20 | (5, 2) | (8, 4), (4, 4) |
| | (10, 1) | (2, —), (4, —) |
| 24 | (4, 3) | (8, 4), (4, 4) |
| | (6, 2) | (8, 4), (4, 4) |
| | (12, 1) | (2, —), (4, —) |
| 28 | (7, 2) | (8, 4), (4, 4) |
| | (14, 1) | (2, —), (4, —) |
| 32 | (4, 4) | (4, 4), (8, 8) |
| | (8, 2) | (2, 4), (4, 4) |
| | (16, 1) | (2, —), (4, —) |
| | | $(O_1, O_2)$: Alt 1 |
| 20 | (5, 2) | (8, 4), (4, 4) |
| | (10, 1) | (2, —), (4, —) |
| 24 | (4, 3) | (8, 4), (4, 4) |
| | (6, 2) | (8, 4), (4, 4) |
| | (12, 1) | (2, —), (4, —) |
| 28 | (7, 2) | (8, 4), (4, 4) |
| | (14, 1) | (2, —), (4, —) |
| 32 | (4, 4) | (4, 4), (8, 8) |
| | (8, 2) | (2, 8), (4, 4) |
| | (16, 1) | (2, —), (4, —) |
| | | $(O_1, O_2)$: Alt 2 |
| 20 | (5, 2) | (8, 4), (4, 4) |
| | (10, 1) | (2, —), (4, —) |
| 24 | (4, 3) | (8, 4), (4, 4) |
| | (6, 2) | (8, 4), (4, 4) |
| | (12, 1) | (2, —), (4, —) |
| 28 | (7, 2) | (8, 4), (4, 4) |
| | (14, 1) | (2, —), (4, —) |
| 32 | (4, 4) | (4, 4), (8, 8) |
| | (8, 2) | (4, 8), (4, 4) |
| | (16, 1) | (2, —), (4, —) |
| | | $(O_1, O_2)$: Alt 3 |
| 20 | (5, 2) | (8, 4), (4, 4) |
| | (10, 1) | (2, —), (4, —) |
| 24 | (4, 3) | (8, 4), (4, 4) |
| | (6, 2) | (8, 4), (4, 4) |
| | (12, 1) | (2, —), (4, —) |
| 28 | (7, 2) | (8, 4), (4, 4) |
| | (14, 1) | (2, —), (4, —) |
| 32 | (4, 4) | (4, 4), (8, 8) |
| | (8, 2) | (2, 4), (2, 8), (4, 8), (4, 4) |
| | (16, 1) | (2, —), (4, —) |

TABLE 42

Supported configurations of and: N = 7

| Number of CSI-RS antenna ports, P | $(N_1, N_2)$ | |
|---|---|---|
| | | $(O_1, O_2)$: Alt 0 |
| 20 | (2, 5) | (8, 4), (8, 8) |
| | (5, 2) | (8, 4), (4, 4) |
| | (10, 1) | (2, —), (4, —) |
| 24 | (2, 6) | (8, 4), (8, 8) |
| | (3, 4) | (8, 4), (8, 8) |
| | (4, 3) | (8, 4), (4, 4) |
| | (6, 2) | (8, 4), (4, 4) |
| | (12, 1) | (2, —), (4, —) |
| 28 | (2, 7) | (8, 4), (8, 8) |
| | (7, 2) | (8, 4), (4, 4) |
| | (14, 1) | (2, —), (4, —) |
| 32 | (2, 8) | (4, 2), (4, 4) |
| | (4, 4) | (4, 4), (8, 8) |
| | (8, 2) | (2, 4), (4, 4) |
| | (16, 1) | (2, —), (4, —) |
| | | $(O_1, O_2)$: Alt 1 |
| 20 | (2, 5) | (8, 4), (8, 8) |
| | (5, 2) | (8, 4), (4, 4) |
| | (10, 1) | (2, —), (4, —) |
| 24 | (2, 6) | (8, 4), (8, 8) |
| | (3, 4) | (8, 4), (8, 8) |
| | (4, 3) | (8, 4), (4, 4) |
| | (6, 2) | (8, 4), (4, 4) |
| | (12, 1) | (2, —), (4, —) |
| 28 | (2, 7) | (8, 4), (8, 8) |
| | (7, 2) | (8, 4), (4, 4) |
| | (14, 1) | (2, —), (4, —) |
| 32 | (2, 8) | (8, 2), (4, 4) |
| | (4, 4) | (4, 4), (8, 8) |
| | (8, 2) | (2, 8), (4, 4) |
| | (16, 1) | (2, —), (4, —) |
| | | $(O_1, O_2)$: Alt 2 |
| 20 | (2, 5) | (8, 4), (8, 8) |
| | (5, 2) | (8, 4), (4, 4) |
| | (10, 1) | (2, —), (4, —) |
| 24 | (2, 6) | (8, 4), (8, 8) |
| | (3, 4) | (8, 4), (8, 8) |
| | (4, 3) | (8, 4), (4, 4) |
| | (6, 2) | (8, 4), (4, 4) |
| | (12, 1) | (2, —), (4, —) |
| 28 | (2, 7) | (8, 4), (8, 8) |
| | (7, 2) | (8, 4), (4, 4) |
| | (14, 1) | (2, —), (4, —) |
| 32 | (2, 8) | (8, 4), (4, 4) |
| | (4, 4) | (4, 4), (8, 8) |
| | (8, 2) | (4, 8), (4, 4) |
| | (16, 1) | (2, —), (4, —) |
| | | $(O_1, O_2)$: Alt 3 |
| 20 | (2, 5) | (8, 4), (8, 8) |
| | (5, 2) | (8, 4), (4, 4) |
| | (10, 1) | (2, —), (4, —) |
| 24 | (2, 6) | (8, 4), (8, 8) |
| | (3, 4) | (8, 4), (8, 8) |
| | (4, 3) | (8, 4), (4, 4) |
| | (6, 2) | (8, 4), (4, 4) |
| | (12, 1) | (2, —), (4, —) |
| 28 | (2, 7) | (8, 4), (8, 8) |
| | (7, 2) | (8, 4), (4, 4) |
| | (14, 1) | (2, —), (4, —) |
| 32 | (2, 8) | (4, 2), (8, 2), (8, 4), (4, 4) |
| | (4, 4) | (4, 4), (8, 8) |
| | (8, 2) | (2, 4), (2, 8), (4, 8), (4, 4) |
| | (16, 1) | (2, —), (4, —) |

Two examples $(O_1, O_2)$ and $(N_1, N_2)$ configuration tables for N=8 are shown in Table 43 and Table 44. Note that in this example Alt 0-Alt 3 are identical.

TABLE 43

Supported configurations of and: N1 ≥ N2 and N = 8

| Number of CSI-RS antenna ports, P | $(N_1, N_2)$ | $(O_1, O_2)$ |
|---|---|---|
| 20 | (5, 2) | (8, 4), (4, 4) |
|  | (10, 1) | (2, —), (4, —) |
| 24 | (4, 3) | (8, 4), (4, 4) |
|  | (6, 2) | (8, 4), (4, 4) |
|  | (12, 1) | (2, —), (4, —) |
| 28 | (7, 2) | (8, 4), (4, 4) |
|  | (14, 1) | (2, —), (4, —) |
| 32 | (4, 4) | (4, 4), (8, 8) |
|  | (8, 2) | (8, 4), (4, 4) |
|  | (16, 1) | (2, —), (4, —) |

TABLE 44

Supported configurations of and: N = 8

| Number of CSI-RS antenna ports, P | $(N_1, N_2)$ | $(O_1, O_2)$ |
|---|---|---|
| 20 | (2, 5) | (8, 4), (8, 8) |
|  | (5, 2) | (8, 4), (4, 4) |
|  | (10, 1) | (2, —), (4, —) |
| 24 | (2, 6) | (8, 4), (8, 8) |
|  | (3, 4) | (8, 4), (8, 8) |
|  | (4, 3) | (8, 4), (4, 4) |
|  | (6, 2) | (8, 4), (4, 4) |
|  | (12, 1) | (2, —), (4, —) |
| 28 | (2, 7) | (8, 4), (8, 8) |
|  | (7, 2) | (8, 4), (4, 4) |
|  | (14, 1) | (2, —), (4, —) |
| 32 | (2, 8) | (8, 4), (8, 8) |
|  | (4, 4) | (4, 4), (8, 8) |
|  | (8, 2) | (8, 4), (4, 4) |
|  | (16, 1) | (2, —), (4, —) |

In some embodiments, a UE is configured with higher-layer parameters codebook-Config-N1, codebook-Config-N2, codebook-Over-Sampling-RateConfig-O1, codebook-Over-Sampling-RateConfig-O2, and Codebook-Config to configure Class A codebook parameters $N_1$, $N_2$, $O_1$, $O_2$, Codebook-Config for {20, 24, 28, 32} antenna ports, where the supported values of (1) $(N_1, N_2)$ and $(O_1, O_2)$ are as at least one of Table 3, Table 5-Table 31, or Table 33 or Table 35-Table 44; and (2) Codebook-Config=1, 2, 3, 4.

The UE derives a first PMI value $i_1$ corresponds to the codebook indices pair $\{i_{1,1}, i_{1,2}\}$, and a second PMI value $i_2$ corresponds to the codebook index $i_2$ given in Table 4 for rank 1, and in LTE specification.

Figure 14:
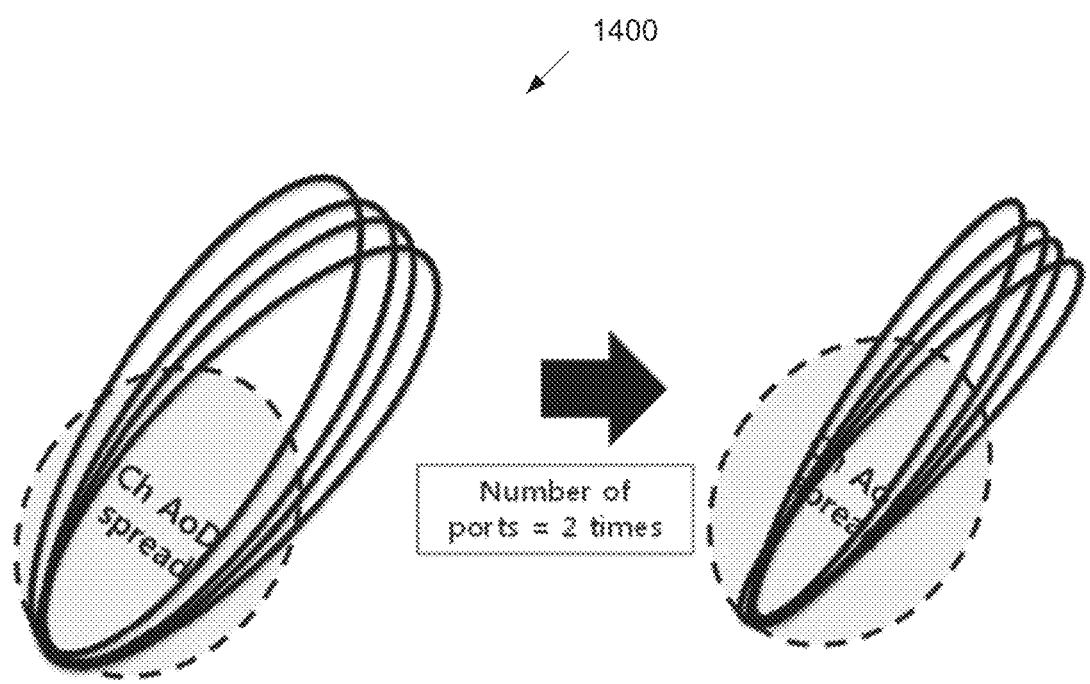
FIG. 14 illustrates example beams according to embodiments of the present disclosure.

FIG. 14 illustrates example beams 1400 according to embodiments of the present disclosure. An embodiment of the beams 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

As the number of antenna ports increases, the DFT beams get narrower and beamforming gains increase. An illustration of this phenomenon is shown in FIG. 14. For instance, for $N_1=16$, the approximate half power beam-width is 6 degree assuming a uniform linear array with half of carrier wavelength spacing between two adjacent antenna ports. This may be an issue, especially for 1D antenna port layouts, because four adjacent beams indicated by $i_1$ or $(i_{1,1}, i_{1,2})$ in case of Codebook-Config=2, 3, 4 may not be able to capture the channel AoD spread, which in turn may lead to performance loss because of poor dominant channel direction quantization. In order to overcome this issue, the codebook may be able to capture the channel AoD spread. Several embodiments are provided below to achieve this.

In some embodiments, a UE is configured with Class A codebook parameters comprising of one $(N_1, N_2)$ pair, one or multiple $(O_1, O_2)$ pairs, and one Codebook-Config, where the configured values of these parameters are according to some embodiments of this disclosure.

When the UE is configured with multiple $(O_1, O_2)$ pairs, the UE selects one $(O_1, O_2)$ pair out of the configured pairs and indicates the selected pair as part of the CSI report. In one embodiment, this indication is WB and long-term. In one example, this indication is implicit or embedded, for example in RI or $i_1$ or $(i_{1,1}, i_{1,2})$ reporting. In another example, it is explicit as another CSI component together with RI, CQI, $i_2$, and $i_1$ or $(i_{1,1}, i_{1,2})$. In this method, it may be referred to as OI or OFI (Oversampling Factor Indication). In yet another example, when periodic CSI reporting on PUCCH is configured, OI or OFI is reported either separately or jointly with RI or $i_1$ or $(i_{1,1}, i_{1,2})$ or both. In another embodiment, this indication is SB and short-term. In one example, this indication is implicit or embedded, for example in $i_2$. In another example, it is explicit as another CSI component OI or OFI.

When the UE is configured with one $(O_1, O_2)$ pair, the UE does not report OI or OFI.

The configured $(O_1, O_2)$ pair/pairs may either be based on (1) Alt 0: long-term UL channel measurement using SRS, for example, assuming UL-DL duplex distance is small; Alt 1: eNB processing of UE CSI reports gathered over time, periodically or aperiodically; Alt 2: a combination of Alt 0 and Alt 1; or Alt 3: eNB relies on UE and hence configures all supported pairs.

A legacy (up to Rel. 13) UE is always configured with one $(O_1, O_2)$ pair, hence does not report OI or OFI. The Rel. 14 UE, however, may or may not be configured with one or multiple $(O_1, O_2)$ pairs, depending on which it either reports or does not report OI or OFI.

In some embodiments, a UE is configured with Class A codebook parameters comprising of one $(N_1, N_2)$ pair, one $(O_1, O_2)$ pair, none or one or multiple $(p_1, p_2)$ pairs and one Codebook-Config, where $p_1$ and $p_2$ respectively are beam spacing parameters in 1st and 2nd dimensions, and the configured values of these parameters are according to some embodiments of this present disclosure.

The beam spacing parameter determines the spacing between the two adjacent beams in a beam group (indicated by $i_1$ or $(i_{1,1}, i_{1,2})$ of W1 codebook) as follows. For dimension d=1, 2, starting from the beam index $i_d$, indices of $L_d$ beams forming a beam group are $i_d$, $i_d+p_d$, $i_d+2p_d$, . . . , $i_d+(L_d-1)p_d$. Example values of beam spacing parameters include: (1) $p_1=1, 2, \ldots, O_1/4, O_1/2, O_1$; and $p_2=1, 2, \ldots, O_2/4, O_2/2, O_2$.

Figure 15:
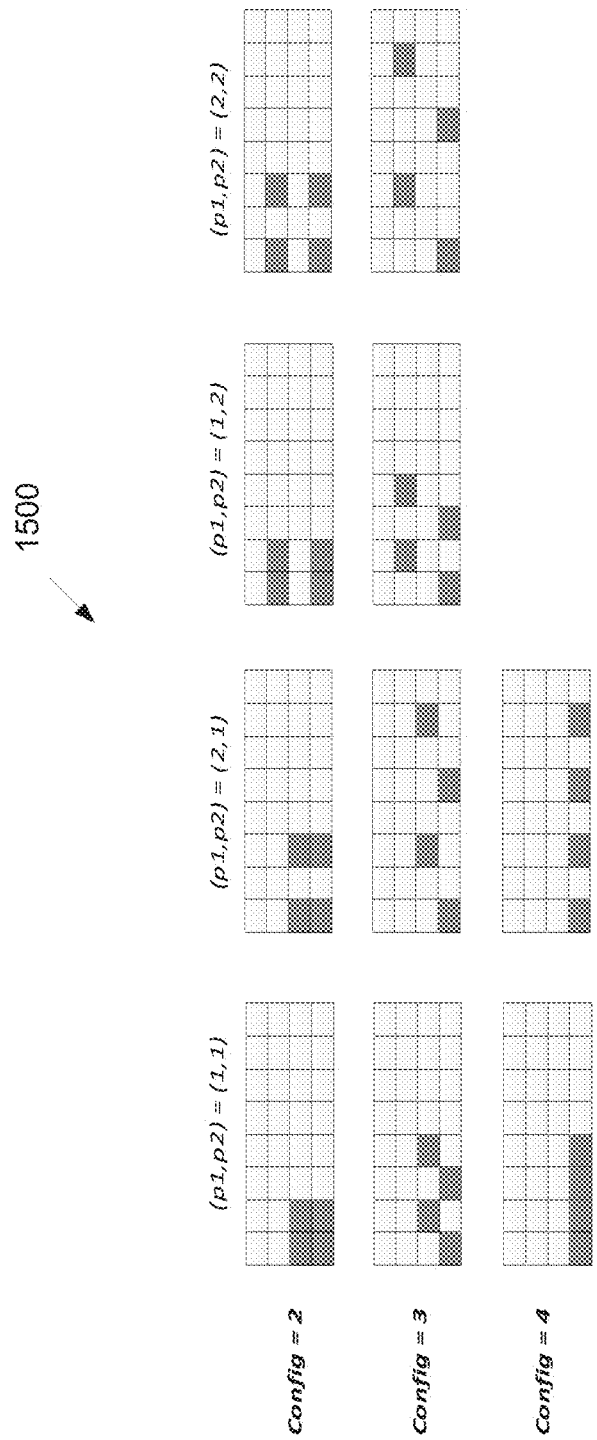
FIG. 15 illustrates example W1 beam groups with configurable beam spacing parameters $(p_1, p_2)$ for Config=2, 3, and 4 according to embodiments of the present disclosure.

FIG. 15 illustrates example W1 beam groups with configurable beam spacing parameters $(p_1, p_2)$ 1500 for Config=2, 3, and 4 according to embodiments of the present disclosure. An embodiment of the W1 beam groups with configurable beam spacing parameters $(p_1, p_2)$ 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

A few examples of W1 beam groups for four beam spacing parameter pairs $(p_1, p_2)$ $p_2)=(1, 1), (1, 2), (2, 1)$, and $(2, 2)$ are shown in FIG. 15.

When the UE is configured with multiple $(p_1, p_2)$ pairs, the UE selects one $(p_1, p_2)$ pair out of the configured pairs and indicates the selected pair as part of the CSI report. In one embodiment, this indication is WB and long-term. In one example, this indication is implicit or embedded, for example in RI or $i_1$ or $(i_{1,1}, i_{1,2})$ reporting. In another example, this indication is explicit as another CSI component together with RI, CQI, $i_2$, and $i_1$ or $(i_{1,1}, i_{1,2})$. In yet another example, it may be referred to as BSI or SI (Beam Spacing Indication). In yet another example, when periodic CSI reporting on an uplink channel is configured, BI or BSI is reported either separately or jointly with RI or $i_1$ or $(i_{1,1}, i_{1,2})$ or both. In another embodiment, this indication is SB and short-term. In one example, this indication is implicit or embedded, for example in $i_2$. In another example, it is explicit as another CSI component BI or BSI.

A legacy (up to Rel. 13) UE is not configured with any $(p_1, p_2)$ pair, hence does not report BSI or SI. The Rel. 14 UE, however, may or may not be configured with any $(p_1, p_2)$ pairs. When a Rel. 14 UE is not configured with $(p_1, p_2)$, the Rel. 14 UE uses the default $(p_1, p_2)$ parameter, for example, as in Rel. 13 codebook, and does not report BSI or SI. When the Rel. 14 UE is configured with $(p_1, p_2)$, the Rel. 14 UE either reports or does not report BSI or SI, depending on whether the Rel. 14 UE is configured with one or multiple pairs, respectively. The alternatives to configure $(p_1, p_2)$ pair/pairs are according to Alt0-Alt 3 above.

In some embodiments, a UE is configured with a new Class A codebook which in addition to W1 and W2 codebook components has a new component, which is referred to as W0, which captures the channel AoD spread. The corresponding PMI index is $i_0$ for 1D and $(i_{0,1}, i_{0,2})$ for 2D antenna port layouts. The indication of $i_0$ or $(i_{0,1}, i_{0,2})$ is WB and long-term. In one example, this indication is implicit or embedded, for example in RI or $i_1$ or $(i_{1,1}, i_{1,2})$ reporting. In another method, it is explicit as another PMI component together with RI, CQI, $i_2$, and $i_1$ or $(i_{1,1}, i_{1,2})$. When periodic CSI reporting on an uplink channel is configured, $i_0$ or $(i_{0,1}, i_{0,2})$ is reported either separately or jointly with RI or $i_1$ or $(i_{1,1}, i_{1,2})$ or both.

In one embodiment, a Rel. 14 UE may or may not be configured with W0 component of the Class C codebook, depending on which the Rel. 14 UE either reports or does not report $i_0$ or $(i_{0,1}, i_{0,2})$. When the UE is not configured with W0, the Rel. 14 UE uses the default Class A codebook, which may be the Rel. 13 codebook extension according to some embodiments of this present disclosure.

An example of W0 codebook is 1D or 2D DFT codebook with appropriate oversampling factor(s) and length(s). Some examples of the length of the DFT vectors may include $$\left\lceil \frac{N_d}{4} \right\rceil, \text{ where } d = 1, 2.$$

Some examples of oversampling factor(s) may include 2, 4, and 8.

The UE is configured by higher-layer signaling with W0 codebook parameters such as oversampling factor(s) and length(s) in addition to $(N_1, N_2)$, $(O_1, O_2)$, and Codebook-Config parameters.

In some embodiments, a UE is configured with a new Class A codebook which has the same W1 codebook component as in Rel. 13 Class codebook, but the W2 codebook is extended. The extended W2 codebook is such that it can be configured to support two modes. In one embodiment of beam selection, one beam selection is performed as in Rel. 13. In another embodiment of beam combination, two beams are selected and combined using the same weight, i.e., $\frac{1}{\sqrt{2}}$.

In such embodiment, it Codebook-Config=1, then two selected beams are the closest beams, where the closest beams may be in the 1st dimension, or in the 2nd dimension, or in the diagonal direction (+45 or −45) starting at the beam indicated by $i_1$ or $(i_{1,1}, i_{3,2})$. In such embodiment, if Codebook-Config=2, 3, the following options are available: (1) Option 0: there are 6 possible beam pairs that can be combined; and (2) Option 1: 4 beams pairs are selected out of 6 pairs. For example, the selected 4 pairs may be rank-2 beam pairs (4 different beam pairs in Rel. 10 8-Tx or Rel. 13 Config 3,4), namely (0, 1), (1, 2), (1, 3), and (0, 3) starting at the beam indicated by $i_1$ or $(i_{1,1}, i_{1,2})$. In another example, the selected 4 pairs may be closely spaced rank-2 beam pairs, namely (0, 1), (1, 2), (2, 3), and (0, 3) starting at the beam indicated by $i_1$ or $(i_{1,1}, i_{1,2})$.

When the UE is configured with extended W2 codebook, the UE selects one of the two modes, beam selection and beam combination, and indicates to eNB, where this indication is WB and long-term. In one embodiment, this indication is implicit or embedded, for example in RI or $i_1$ or $(i_{1,1}, i_{1,2})$ reporting. In another method, it is explicit as another CSI component together with RI, CQI, $i_2$, and $i_1$ or $(i_{1,1}, i_{1,2})$. In this method, it may be referred to as beam selection or combination indication (BSCI or SCI).

When periodic CSI reporting on an uplink channel is configured, BSCI or SCI is reported either separately or jointly with RI or $i_1$ or $(i_{1,1}, i_{1,2})$ or both.

In some embodiments, a UE is configured with Class A codebook in which more beams are included in $W_1$ codebook. There are following example alternatives for this. In one embodiment of Alt 1, the number of beams indicated by the Codebook-Config parameter is increased in the longer dimension. For instance, the number of beams is doubled in the longer dimension. In one example, Codebook-Config parameter is mapped to beam groups as in FIG. 17 if (1) $2N_1N_2 \le N_{total}$, for example 20; or (2) $\max(N_1, N_2) \le N$, for example 5, otherwise it is mapped to beam groups as in FIG. 18.

In another embodiment of Alt 2, new Codebook-Config=5, 6, 7, 8 are defined which are mapped to beam groups as in FIG. 18.

Figure 16:
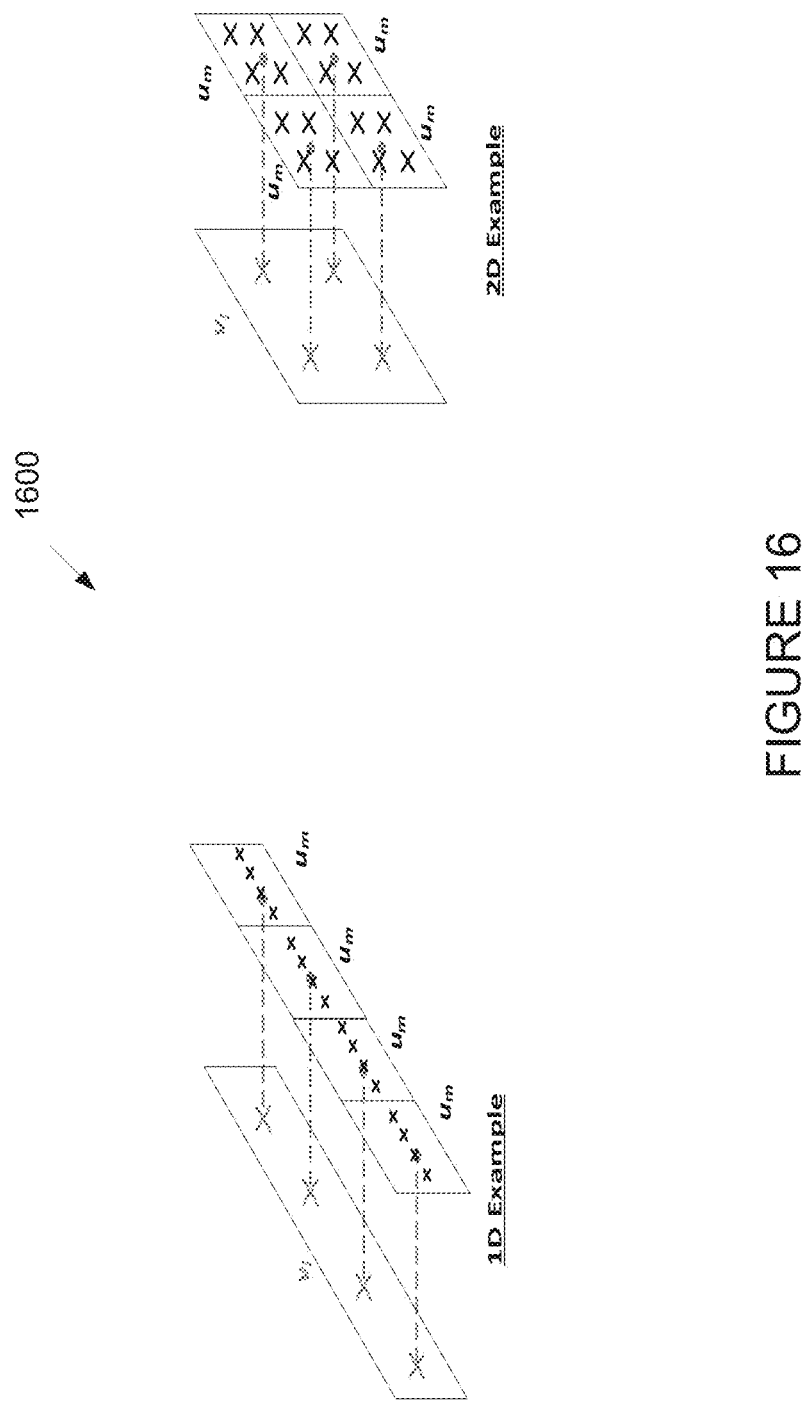
FIG. 16 illustrates an example rank-1 precoder according to embodiments of the present disclosure.

FIG. 16 illustrates an example rank-1 precoder 1600 according to embodiments of the present disclosure. An embodiment of the rank-1 precoder 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

In some embodiments, the UE is configured with a Class A codebook which is based on the antenna subarray or antenna group based partition of the entire 1D or 2D antenna array, an illustration of which is show in FIG. 16. As shown the entire antenna array is partition into 4 subarrays or groups. The construction of subarrays is configured according to the following: (1) the number of ports in the 1st dimension of each subarray or group is $M_1$, where $M_1$ may or may not divide $N_1$; (2) the number of ports in the 2nd dimension of each subarray or group is $M_2$, where $M_2$ may or may not divide $N_2$; and (3) a subarray is 1D for 1D antenna port layouts and is 1D or 2D for 2D antenna port layouts.

The number of subarrays or groups in the dimension $$d = 1, 2 \text{ is } Q_d = \left\lceil \frac{N_d}{M_d} \right\rceil.$$

If $M_d$ divides $N_d$, then $$Q_d = \frac{N_d}{M_d}.$$

The total number of subarrays is $Q=Q_1Q_2$ and the total number of antenna ports in each subarray is $M=M_1M_2$. The rank-1 pre-coder is then given by equation (3).

$$W^{(1)}_{l_1,m_1,l_2,m_2,n} = \frac{1}{\sqrt{2N_1N_2}} \begin{bmatrix} w_{l_1,m_1,l_2,m_2} \\ \varphi_n w_{l_1,m_1,l_2,m_2} \end{bmatrix} \quad \text{Equation (3)}$$

where $$w_{l_1,m_1,l_2,m_2} = \begin{bmatrix} v_{l_1,m_1} & 0 & \cdots & 0 \\ 0 & v_{l_1,m_1} & \cdots & 0 \\ \vdots & \vdots & \ddots & \vdots \\ 0 & 0 & \cdots & v_{l_1,m_1} \end{bmatrix} v_{l_2,m_2} =$$

$$v_{l_2,m_2} \otimes v_{l_1,m_1},$$

wherein $v_{l_1,m_1}$ is the length M 1st pre-coder vector applied to antenna ports in each of Q subarrays and both polarizations, $v_{l_2,m_2}$ is the length Q 2nd pre-coder vector applied to Q subarrays and both polarizations, and $\varphi_n$ is co-phase for the two polarizations, whose definitions are as in equation (2) except that $(N_1, N_2)$ is replaced with $(M_1, M_2)$ and $(Q_1, Q_2)$ for in the definition of $v_{l_1,m_1}$ and $v_{l_2,m_2}$, respectively.

The pre-coder for rank>1 can be derived similarly.

In some embodiments, the number of subarrays in dimension d=1, 2, is $Q_d \in \{1,2,4\}$.

In some embodiments, the set of possible values of $(Q_1, Q_2)$ includes the set $\{(1, 1), (2, 1), (1, 2), (2, 2), (4, 1), (1, 4)\}$. In one embodiment, $v_{l_2,m_2}$ is derived using Kronecker product of 2 DFT vectors of lengths $Q_1$ and $Q_2$ as in (2). In another embodiment, it is derived using legacy (up to Rel. 13) codebooks. In one example, if $(Q_1, Q_2)=(1, 1)$, then the resultant codebook is similar to Rel. 13 codebook, i.e., $v_{l_2,m_2}=1$, and $W^{(1)}_{l_1,m_1,l_2,m_2,n} = W^{(1)}_{l_1,m_1,n}$ as in Table 4. In another example, $(Q_1, Q_2)=(2, 1)$ if $N_1 \geq N_2$ and $(Q_1, Q_2)=(1,2)$ if $N_1<N_2$. In this case, $v_{l_2,m_2}$ is derived using Rel. 8 2-Tx codebook. In yet another example, $(Q_1, Q_2)=(4,1)$ if $N_1 \geq N_2$ and $(Q_1, Q_2)=(1,4)$ if $N_1<N_2$. In this case, $v_{l_2,m_2}$ is derived using Rel. 12 4-Tx codebook.

Alternatively, $$z_{l_2,m_2,n} = \frac{1}{\sqrt{2Q_1Q_2}} \begin{bmatrix} v_{l_2,m_2} \\ \varphi_n v_{l_2,m_2} \end{bmatrix}$$

is derived using Rel. 10 8-Tx codebook and the overall pre-coder is given by $$W^{(1)}_{l_1,m_1,l_2,m_2,n} = \frac{1}{\sqrt{M_1M_2}} z_{l_2,m_2,n} \otimes v_{l_1,m_1}.$$

In another alternative, $(Q_1,Q_2)=(2,2)$, then $$z_{l_2,m_2,n} = \frac{1}{\sqrt{2Q_1Q_2}} \begin{bmatrix} v_{l_2,m_2} \\ \varphi_n v_{l_2,m_2} \end{bmatrix}$$

is derived using Rel. 13 8-Tx codebook.

In some embodiments, the set of possible values of $(M_1, M_2)$ includes the set $\{(a,b): a,b \in \{1,2,3,4,5,6,7,8,10,12,14, 16\}$ such that $a*b \in \{1,2,4,8,12,16,20,24,28,32\}\}$. In one embodiment, $v_{l_1,m_1}$ is derived using Kronecker product of 2 DFT vectors of lengths $M_1$ and $M_2$ as in (2). In another embodiment, it is derived using legacy (up to Rel. 13) codebooks, as mentioned in above embodiment.

In some embodiments, the block diagonal matrix in equation (3) may or may not have the same diagonal blocks. In one example of Alt 1, the diagonal blocks are the same. In another example of Alt 2, the diagonal blocks can be different.

In some embodiments, the UE is configured with an antenna subarray or group type via RRC signaling parameter namely Subarray-Config or Group-Config or Antenna-Group-Config, from a plurality of subarray types. In one embodiment, the set of possible subarray types corresponds to the supported antenna port configurations (up to Rel. 13) in terms of $(N_1, N_2)$ values (FIG. 12). In another embodiment, at least one of possible subarray types does not correspond to the supported antenna port configurations (up to Rel. 13) in terms of $(N_1, N_2)$ values.

In some embodiments, the UE is configured with a subarray type configuration in terms of $(N_1, N_2)$ for the full antenna port layout and $(M_1, M_2)$ for the number of antenna ports in each subarray.

In some embodiments, the UE is configured with a subarray type configuration in terms of $(N_1, N_2)$ for the full antenna port layout and $(Q_1, Q_2)$ for the number of antenna ports in each subarray.

In some embodiments, the UE is configured with a subarray type configuration in terms of $(M_1, M_2)$ for the number of antenna ports in each subarray and $(Q_1, Q_2)$ for the number of antenna ports in each subarray.

In some embodiments, the subarray type configuration is cell-specific, and hence remains the same for all UEs.

In some embodiments, the subarray type configuration is UE-specific, and hence a UE is configured with a subarray type from a plurality of subarray types.

In some embodiments, the UE suggests a preferred subarray type to the eNB.

In some embodiments, the subarray type is pre-determined, hence does not need configuration.

In some embodiments, the subarray type configuration is semi-static via RRC or is more dynamic via CSI configuration.

In some embodiments, the codebook parameter configuration includes some of the following parameters. In one example, the codebook parameter configuration includes a subarray type configuration to configure the subarray type according to some embodiments of this present disclosure: Subarray-Config or Group-Config or AntennaGroup-Config; $(N_1, N_2)$ and $(M_1, M_2)$; $(N_1, N_2)$ and $(Q_1, Q_2)$; or $(M_1, M_2)$ and $(Q_1, Q_2)$. In another example, the codebook parameter configuration includes $(s_1, s_2)$: the spacing between two nearest antenna ports in the subarray. The set of values for $s_1$ and $s_2$ includes 1. In another example, the codebook parameter configuration includes oversampling factor: (1) Alt 1: $(O_1, O_2)$ for both $v_{l_1,m_1}$ and $v_{l_2,m_2}$; and Alt 2: $(O_{11}, O_{21})$: the oversampling factors for 1st stage pre-coder $v_{l_1,m_1}$ and $(O_{12}, O_{22})$: the oversampling factors for 2nd stage pre-coder $v_{l_2,m_2}$. In yet another example, the codebook parameter configuration includes Codebook-Config: the set of values include 1, 2, 3, 4 which may or may not correspond to Rel. 13 FD-MIMO codebook. Assuming Codebook-Config1 is for $v_{l_1,m_1}$ and Codebook-Config2 is for $v_{l_2,m_2}$ the following alternatives may be configured: (1) Codebook-Config1=Codebook-Config2; (2) Codebook-Config1≠Codebook-Config2; (3) Codebook-Config1=1 for $v_{l_1,m_1}$ and Codebook-Config2=1, 2, 3, 4 for $v_{l_2,m_2}$; and (4) Codebook-Config1=1, 2, 3, 4 for $v_{l_1,m_1}$ and Codebook-Config2=1 for $v_{l_2,m_2}$.

In some embodiments, the codebook parameters are configured such that at least one of both of $v_{l_2,m_2}$ and $v_{l_2,m_2}$ are derived from legacy (up to Rel. 13) codebooks.

In some embodiments, the UE is configured with eMIMO-Type 'Class A' or 'Class A1' or 'Class A2' or 'Class A3' and hence reports two or three PMIs indicating codebook components $v_{l_1,m_1}$, $v_{l_2,m_2}$, and $\varphi_n$ as shown in Table 46.

TABLE 46 eMIMO-Type configuration tables

| eMIMO-Type | 1st PMI (WB) | 2nd PMI (WB) | 2nd PMI (SB) | 3rd PMI (SB) |
|---|---|---|---|---|
| A | $i_1$ or $(i_{1,1}, i_{1,2})$ for both $v_{l_1, m_1}$ and $v_{l_2, m_2}$ | — | $i_2$ for $\varphi_n$ and beam selection | — |
| A1 | $i_1$ or $(i_{1,1}, i_{1,2})$ for $v_{l_1, m_1}$ | — | $i_2$ or $(i_{2,1}, i_{2,2})$ for both $v_{l_2, m_2}$ and $\varphi_n$ and beam selection | — |
| A2 | $i_1$ or $(i_{1,1}, i_{1,2})$ for both $v_{l_1, m_1}$ | $i_2$ or $(i_{2,1}, i_{2,2})$ for both $v_{l_2, m_2}$ | — | $i_3$ for $\varphi_n$ and beam selection |
| A3 | $i_1$ or $(i_{1,1}, i_{1,2})$ for both $v_{l_1, m_1}$ | — | $i_2$ or $(i_{2,1}, i_{2,2})$ for both $v_{l_2, m_2}$ | $i_3$ for $\varphi_n$ and beam selection |

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for a channel state information (CSI) feedback in an advanced communication system, the UE comprising:

a transceiver configured to receive, from a base station (BS), CSI feedback configuration information for a precoding matrix indicator (PMI) feedback using a higher layer signaling, wherein the CSI feedback configuration information includes a combination of an oversampling factor $(O_1, O_2)$ and a dual polarized CSI reference signal (CSI-RS) antenna port layout $(N_1, N_2)$, and wherein subscripts 1 and 2 stand for a first dimension and a second dimension, respectively, and a number of dual polarized CSI-RS ports $P=2N_1N_2$; and at least one processor configured to:

identify the combination of the $(O_1, O_2)$ and $(N_1, N_2)$ from a table including at least the combinations of the $(O_1, O_2)$ and $(N_1, N_2)$ as follows:

| Number of CSI-RS antenna ports (P) | $(N_1, N_2)$ | $(O_1, O_2)$ |
|---|---|---|
| 20 | (2, 5) | (8, 4) |
|  | (5, 2) | (4, 4) |
|  | (10, 1) | (4, —) |
| 24 | (2, 6) | (8, 4) |
|  | (3, 4) | (8, 4) |
|  | (4, 3) | (4, 4) |
|  | (6, 2) | (4, 4) |
|  | (12, 1) | (4, —) |
| 28 | (2, 7) | (8, 4) |
|  | (7, 2) | (4, 4) |
|  | (14, 1) | (4, —) |
| 32 | (2, 8) | (8, 4) |
|  | (4, 4) | (8, 4) |
|  | (8, 2) | (4, 4) |
|  | (16, 1) | (4, —), | and determine the PMI using a Class A codebook based on the combination of the $(O_1, O_2)$ and $(N_1, N_2)$, wherein the transceiver is further configured to transmit, to the BS, the CSI feedback over an uplink channel including the determined PMI.

2. The UE of claim 1, wherein the Class A codebook corresponds to the Class A codebook in long-term-evolution (LTE) specification.

3. The UE of claim 1, wherein the higher layer signaling comprises at least one of a codebook-Config-N1 parameter to configure $N_1$, a codebook-Config-N2 parameter to configure $N_2$, a codebook-Over-Sampling-RateConfig-O1 parameter to configure $O_1$, a codebook-Over-Sampling-RateConfig-O2 parameter to configure $O_2$, or a Codebook-Config parameter to configure a value from a set {1,2,3,4} that corresponds to four types of beam groups for the PMI feedback using the Class A codebook.

4. The UE of claim 1, wherein the at least one processor is further configured to:
  derive a first PMI corresponding to the Class A codebook index pair $\{i_{1,1}, i_{1,2}\}$; and
  derive a second PMI $i_2$ corresponding to the Class A codebook index $i_2$,
  wherein the PMI comprises the first PMI $i_1$ and the second PMI $i_2$.

5. The UE of claim 1, wherein the at least one processor is further configured to determine a Class A codebook parameter that comprises at least one of a $(N_1, N_2)$ pair, one or multiple $(O_1, O_2)$ pairs, or a Codebook-Config parameter, wherein the Codebook-Config parameter belongs to a set $\{1, 2, 3, 4\}$ that corresponds to four types of beam groups for the PMI feedback using the Class A codebook.

6. The UE of claim 1, wherein the at least one processor is further configured to determine a Class A codebook parameter that comprises at least one of a $(N_1, N_2)$ pair, a $(O_1, O_2)$ pair, none or at least one $(p_1, p_2)$ pair, or a Codebook-Config parameter, wherein the Codebook-Config parameter belongs to a set $\{1, 2, 3, 4\}$ that corresponds to four types of beam groups for the PMI feedback using the Class A codebook, and the at least one $(p_1, p_2)$ pair comprises beam spacing parameters in the first and second dimensions to construct beam groups according to a value of Codebook-Config parameter, and wherein at least one of $p_1$ and $p_2$ comprises at least one value from a set $\{1, 2, \ldots, O_1\}$ and a set $\{1, 2, \ldots, O_2\}$, respectively.

7. A base station (BS) for a channel state information (CSI) feedback in an advanced communication system, the BS comprising:
  a transceiver configured to:
    transmit, to a user equipment (UE), CSI feedback configuration information for a precoding matrix indicator (PMI) feedback using a higher layer signaling, wherein the CSI feedback configuration information includes a combination of an oversampling factor $(O_1, O_2)$ and a dual polarized CSI reference signal (CSI-RS) antenna port layout $(N_1, N_2)$, wherein subscripts 1 and 2 stand for a first dimension and a second dimension, respectively, and a number of dual polarized CSI-RS ports $P=2N_1N_2$, and wherein the combination of the $(O_1, O_2)$ and $(N_1, N_2)$ is indicated based on a table including at least the combinations of the $(O_1, O_2)$ and $(N_1, N_2)$ as follows:

| Number of CSI-RS antenna ports (P) | $(N_1, N_2)$ | $(O_1, O_2)$ |
|---|---|---|
| 20 | (2, 5) | (8, 4) |
|  | (5, 2) | (4, 4) |
|  | (10, 1) | (4, —) |
| 24 | (2, 6) | (8, 4) |
|  | (3, 4) | (8, 4) |
|  | (4, 3) | (4, 4) |
|  | (6, 2) | (4, 4) |
|  | (12, 1) | (4, —) |
| 28 | (2, 7) | (8, 4) |
|  | (7, 2) | (4, 4) |
|  | (14, 1) | (4, —) |
| 32 | (2, 8) | (8, 4) |
|  | (4, 4) | (8, 4) |
|  | (8, 2) | (4, 4) |
|  | (16, 1) | (4, —); | and
    receive, from the UE, the CSI feedback over an uplink channel including the PMI determined using a Class A codebook based on the configured combination of the $(O_1, O_2)$ and $(N_1, N_2)$.

8. The BS of claim 7, wherein the Class A codebook corresponds to the Class A codebook in long-term-evolution (LTE) specification.

9. The BS of claim 7, wherein the higher layer signaling comprises at least one of a codebook-Config-N1 parameter to configure $N_1$, a codebook-Config-N2 parameter to configure $N_2$, a codebook-Over-Sampling-RateConfig-O1 parameter to configure $O_1$, a codebook-Over-Sampling-RateConfig-O2 parameter to configure $O_2$, or a Codebook-Config parameter to configure a value from a set $\{1,2,3,4\}$ that corresponds to four types of beam groups for the PMI feedback using the Class A codebook.

10. The BS of claim 7, wherein a Class A codebook parameter comprises at least one of a $(N_1, N_2)$ pair, one or multiple $(O_1, O_2)$ pairs, or a Codebook-Config parameter, and wherein the Codebook-Config parameter belongs to a set $\{1, 2, 3, 4\}$ that corresponds to four types of beam groups for the PMI feedback using the Class A codebook.

11. The BS of claim 7, wherein a Class A codebook parameter comprises at least one of a $(N_1, N_2)$ pair, a $(O_1, O_2)$ pair, none or at least one $(p_1, p_2)$ pair, or a Codebook-Config parameter, wherein the Codebook-Config parameter belongs to a set $\{1, 2, 3, 4\}$ that corresponds to four types of beam groups for the PMI feedback using the Class A codebook, and the at least one $(p_1, p_2)$ pair comprises beam spacing parameters in the first and second dimensions to construct beam groups according to a value of Codebook-Config parameter, and wherein at least one of $p_1$ and $p_2$ comprises at least one value from a set $\{1, 2, \ldots, O_1\}$ and a set $\{1, 2, \ldots, O_2\}$, respectively.

12. A method for a channel state information (CSI) feedback in an advanced communication system, the method comprising:
  receiving, from a base station (BS), CSI feedback configuration information for a precoding matrix indicator (PMI) feedback using a higher layer signaling, wherein the CSI feedback configuration information includes a combination of an oversampling factor $(O_1, O_2)$ and a dual polarized CSI reference signal (CSI-RS) antenna port layout $(N_1, N_2)$, and wherein subscripts 1 and 2 stand for a first dimension and a second dimension, respectively, and a number of dual polarized CSI-RS ports $P=2N_1N_2$;
  identifying, by a user equipment (UE), the combination of the $(O_1, O_2)$ and $(N_1, N_2)$ from a table including at least the combinations of the $(O_1, O_2)$ and $(N_1, N_2)$ as follows:

| Number of CSI-RS antenna ports (P) | $(N_1, N_2)$ | $(O_1, O_2)$ |
|---|---|---|
| 20 | (2, 5) | (8, 4) |
|  | (5, 2) | (4, 4) |
|  | (10, 1) | (4, —) |
| 24 | (2, 6) | (8, 4) |
|  | (3, 4) | (8, 4) |
|  | (4, 3) | (4, 4) |
|  | (6, 2) | (4, 4) |
|  | (12, 1) | (4, —) |
| 28 | (2, 7) | (8, 4) |
|  | (7, 2) | (4, 4) |
|  | (14, 1) | (4, —) |

| Number of CSI-RS antenna ports (P) | ($N_1$, $N_2$) | ($O_1$, $O_2$) |
|---|---|---|
| 32 | (2, 8) | (8, 4) |
| | (4, 4) | (8, 4) |
| | (8, 2) | (4, 4) |
| | (16, 1) | (4, —); | determining, the UE, the PMI using a Class A codebook based on the combination of the ($O_1$, $O_2$) and ($N_1$, $N_2$); and transmitting, to the BS, the CSI feedback over an uplink channel including the determined PMI.

13. The method of claim 12, wherein the Class A codebook corresponds to the Class A codebook in long-term-evolution (LTE) specification.

14. The method of claim 12, wherein the higher layer signaling comprises at least one of a codebook-Config-N1 parameter to configure $N_1$, a codebook-Config-N2 parameter to configure $N_2$, a codebook-Over-Sampling-RateConfig-O1 parameter to configure $O_1$, a codebook-Over-Sampling-RateConfig-O2 parameter to configure $O_2$, or a Codebook-Config parameter to configure a value from a set {1,2,3,4} that corresponds to four types of beam groups for the PMI feedback using the Class A codebook.

15. The method of claim 12, further comprising:
deriving a first PMI $i_1$ corresponding to the Class A codebook index pair {$i_{1,1}$,$i_{1,2}$}; and
deriving a second PMI $i_2$ corresponding to the Class A codebook index $i_2$,
wherein the PMI comprises the first PMI $i_1$ and the second PMI $i_2$.

16. The method of claim 12, further comprising determining a Class A codebook parameter that comprises at least one of a ($N_1$, $N_2$) pair, one or multiple ($O_1$, $O_2$) pairs, or a Codebook-Config parameter, wherein the Codebook-Config parameter belongs to a set {1, 2, 3, 4} that corresponds to four types of beam groups for the PMI feedback using the Class A codebook.

17. The method of claim 12, further comprising determining a Class A codebook parameter that comprises at least one of a ($N_1$, $N_2$) pair, a ($O_1$, $O_2$) pair, none or at least one ($p_1$, $p_2$) pair, or a Codebook-Config parameter, wherein the Codebook-Config parameter belongs to a set {1, 2, 3, 4} that corresponds to four types of beam groups for the PMI feedback using the Class A codebook, and the at least one ($p_1$, $p_2$) pair comprises beam spacing parameters in the first and second dimensions to construct beam groups according to a value of Codebook-Config parameter, and wherein at least one of $p_1$ and $p_2$ comprises at least one value from a set {1, 2, . . . , $O_1$} and a set {1, 2, . . . , $O_2$}, respectively.

* * * * *